US012574875B2

(12) United States Patent
Petersen, III

(10) Patent No.: US 12,574,875 B2
(45) Date of Patent: Mar. 10, 2026

(54) DISTRIBUTED CARRIER WITH JOINT EQUALIZATION

(71) Applicant: Spectric Labs, Inc., Chantilly, VA (US)

(72) Inventor: Willis Lauritz Petersen, III, San Antonio, TX (US)

(73) Assignee: Spectric Labs, Inc., Chantilly, VA (US)

( * ) Notice: Subject to any disclaimer, the term of this patent is extended or adjusted under 35 U.S.C. 154(b) by 466 days.

(21) Appl. No.: 18/188,539

(22) Filed: Mar. 23, 2023

(65) Prior Publication Data

US 2023/0327797 A1 Oct. 12, 2023

Related U.S. Application Data

(60) Provisional application No. 63/324,181, filed on Mar. 28, 2022.

(51) Int. Cl.
*H04W 56/00* (2009.01)
*H04K 3/00* (2006.01)
*H04L 9/40* (2022.01)

(52) U.S. Cl.
CPC ........ *H04W 56/0015* (2013.01); *H04K 3/827* (2013.01); *H04W 56/0035* (2013.01); *H04L 63/162* (2013.01)

(58) Field of Classification Search
CPC ......... H04W 56/0015; H04W 56/0035; H04W 56/005; H04W 56/0045; H04K 3/827; H04L 63/162
See application file for complete search history.

(56) References Cited

U.S. PATENT DOCUMENTS

2021/0218522 A1* 7/2021 Sethuraman ........ H04L 25/0224

OTHER PUBLICATIONS (TW 201414249 A), Agrawal et al., Unified Pulse Shaping For Multi-carrier And Single-carrier Waveforms, Apr. 2014, pp. 1-11 (Year: 2014).*

* cited by examiner

*Primary Examiner* — Keith Ferguson
(74) *Attorney, Agent, or Firm* — Michael P. Fortkort; Protorae Law PLLC

(57) ABSTRACT

A communications waveform schema integrates security at the physical layer and has many desirable features of traditional LPI/LPD waveforms. To provide additional covert aspects in communications a single-carrier base waveform is divided up in frequency and/or time and redistributed pseudo-randomly among subcarriers and channel assignment. Multiple matched polyphase filterbank channelizers are used so that each individual channel has a bandwidth well below a Nyquist rate for information carried by the base waveform, thereby making full data extraction from any individual channels a theoretic impossibility. The individual channels do not carry enough information from the base waveform to be useful and only in the aggregate can the entire base waveform be reconstructed. Individual channels are up-converted onto pseudo-randomly chosen carrier frequencies within the bandwidth of the high rate hardware IF in such a way as to obfuscate the order in which they occur in the base waveform.

19 Claims, 38 Drawing Sheets

FIG 15

Frequency

QPSK Signal Lower Chan Symbols

QPSK Signal Upper Chan Symbols

Contrived Signal Lower Chan Symbols

Sum of Upper & Lower Chan Symbols

1. Begin with a base waveform burst

2. Create channelizers with aligned filters

3. Channelize the base waveform

4. Distribute the Strips Over Multiple Timeslots and Frequencies

DISTRIBUTED CARRIER WITH JOINT EQUALIZATION

RELATED APPLICATIONS

This non-provisional patent application claims the benefit of and priority to U.S. Provisional Patent Application No. 63/324,181 entitled "Distributed Carrier With Joint Equalization" filed Mar. 28, 2022 by the same inventor and same Applicant. U.S. Provisional Patent Application No. 63/324,181 is hereby incorporated by reference as if repeated herein in its entirety, including the drawings.

This non-provisional patent application also claims the benefit of and priority to U.S. Non-Provisional Patent Application No. 18/188,556, now U.S. Pat. No. 12,490,212 issued Dec. 2, 2025, entitled "Method for Performing Synchronization in Distributed Carrier Communications" filed on even date herewith by the same inventor and same Applicant. U.S. Non-Provisional Patent Application No. 18/188,556 is also hereby incorporated by reference as if repeated herein in its entirety, including the drawings.

BACKGROUND

The present invention relates generally to communications systems, and more particularly to a communications system for communicating covertly.

Generating LPD waveforms that are also capable of supporting high data rate user throughput is challenging and requires innovative approaches. Some traditional methods of generating LPD waveforms employ direct sequence spread spectrum (DSSS) technology that lowers power spectral density at the expense of increasing bandwidth. To further decrease spectral density, forward error correction (FEC) codes with high coding gains may be used, but also at the expense of increasing bandwidth. Modulation schemes are typically limited to BPSK or QPSK since higher modulation orders adversely affect spectral energy density and require a proportional increase in bandwidth to maintain the same spectral characteristics. Similarly, adding additional orthogonal channels like Code Division Multiple Access (CDMA) require proportional spreading for the same spectral energy density. Due to practical limitations in physics and radio hardware bandwidth capabilities, LPD waveforms that rely solely on spreading are limited to low data-rate applications.

Traditional LPD waveforms, such as DSSS and CDMA, also introduce repeating sequences which are exploited to perform detection and acquisition. While the waveforms may be spread with large codes to hide the waveform in noise, simple blind cyclostationary and spectral analysis techniques can expose these features allowing the underlying parameters to be learned. Waveforms for secure communications must utilize alternate techniques to avoid these detection methods.

Secure communication applications also need to be aware of the "near-far" problem, i.e., the scenario where an adversary receiver has a geographical advantage over the intended receiver. In this scenario, avoiding simple energy detection is nearly impossible because the waveform would need to be spread to very high levels with a minimal operating range. Another area of concern is if the adversary is able to obtain a high SNR capture of the waveform.

Offline analysis and reverse engineering enable new feature extraction or the ability to develop a targeted detector. To increase the maximum throughput, one cannot rely on traditional spreading LPD techniques alone. For example, using comparable LPD waveform parameters as a reference, the required bandwidth to achieve 1 Gbps user throughput would approach 200 GHz bandwidth. This is an impractical amount of bandwidth. For the waveform to operate on Low-SWaP hardware, the spreading factor would need to be reduced significantly and modulation order increased to levels making the signal operate well above the noise floor. For a large target operating range, the probability of a "near-far" problem also increases. There is also very limited benefit in spreading by small amounts as off-the-shelf monitoring equipment or time-integration methods can still easily detect energy.

The present invention is directed to the problem of developing a robust covert communication system without requiring a large bandwidth to do so.

SUMMARY OF THE INVENTION

The present invention solves this and other problems by providing a new communications waveform schema which can integrate security at the physical layer and has many of the desirable features of traditional LPI/LPD waveforms. The basic idea can be used in different forms to achieve different levels of obfuscation and provides a novel approach to waveform security.

According to one aspect of the present invention, an exemplary embodiment of a method for providing additional covert aspects to a communications system converts an incoming single-carrier base waveform into a distributed carrier base waveform by dividing up the single-carrier base waveform in frequency to form a plurality of frequency strips and redistributing the plurality of frequency strips among a plurality of subcarriers in a pseudo random order and channel assignment.

In this exemplary embodiment, a polyphase channelizer may be employed to divide up the single-carrier base waveform and form the plurality of frequency strips although this is not the only mechanism to do so.

In this exemplary embodiment, redistributing may include channelizing the single-carrier based waveform in such a way that each individual channel has a bandwidth well below a Nyquist rate for any information carried by the base waveform, thereby making full data extraction from any individual channels a theoretic impossibility.

In this exemplary embodiment, the individual channels do not carry enough information from the base waveform to be useful and only in the aggregate can the entire base waveform be reconstructed by the receiver.

After generation, the individual channels are up-converted onto pseudo-randomly chosen carrier frequencies within the bandwidth of the high rate hardware IF in such a way as to obfuscate the order in which they occur in the base waveform.

The purpose of the present invention is to provide increased LPI/LPD security while supporting variable data rates reaching high-throughputs. All waveforms should be generated on a single hardware platform functioning at a high IF bandwidth to maintain coherence. The resulting characteristics of the technique described herein is that there is: (i) no auto-correlation for any individual carriers; (ii) no cross-correlation between pairs of carriers; (iii) multi-carrier FHSS; (iv) a fragmented base waveform over unordered and non-contiguous channels; and (v) a reduced amount of information in each carrier.

For proper reconstruction of the distributed carrier, received strips must be aligned in frequency, phase, amplitude, and time. Timing alignment can be assumed since the strips were created jointly. Each strip is filtered, up-sampled and put into its correct relative frequency position. After up-sampling and frequency alignment, samples are interleaved and fed to a LN-LMS equalizer.

According to another aspect of the present invention, an exemplary embodiment of a method for providing additional covert aspects to a communications system includes: (i) creating a single-carrier base waveform; (ii) dividing up the single-carrier base waveform in frequency and/or time; and (iii) redistributing a plurality of subcarriers in a pseudo random order and channel assignment.

In this exemplary embodiment, the step of dividing may include using multiple matched polyphase filter bank channelizers on the single-carrier base waveform.

In this exemplary embodiment, the step of redistributing may include channelizing a single-carrier based waveform in such a way that each individual channel has a bandwidth well below a Nyquist rate for any information carried by the base waveform, thereby making full data extraction from any individual channels a theoretic impossibility.

In this exemplary embodiment, the individual channels do not carry enough information from the base waveform to be useful and only in the aggregate can the entire base waveform be reconstructed by the receiver.

In this exemplary embodiment, after generation, the individual channels may be up-converted onto pseudo-randomly chosen carrier frequencies within the bandwidth of the high rate hardware IF in such a way as to obfuscate the order in which they occur in the base waveform.

According to another aspect of the present invention, an exemplary embodiment of a method for obfuscating a carrier in a communications system includes: (i) creating a base waveform burst as the carrier; (ii) creating several channelizers with aligned filters; (iii) channelizing the base waveform burst using the channelizers; and (iv) distributing the strips resulting from the channelizing across multiple time slots and frequencies.

In this exemplary embodiment, the step of channelizing may include using multiple matched polyphase filter bank channelizers on a single-carrier base waveform.

In this exemplary embodiment, the steps of channelizing and distributing may include channelizing a single-carrier based waveform in such a way that each individual channel has a bandwidth well below a Nyquist rate for any information carried by the base waveform, thereby making full data extraction from any individual channels a theoretic impossibility.

In this exemplary embodiment, the resulting individual channels do not carry enough information from the base waveform to be useful and only in the aggregate can an entire base waveform be reconstructed by a receiver.

In this exemplary embodiment, the individual channels may be up-converted onto pseudo-randomly chosen carrier frequencies within a bandwidth of a high rate hardware IF in such a way as to obfuscate an order in which they occur in the base waveform.

In this exemplary embodiment, additional processes may be performed in a receiver, including: (i) aligning a plurality of received strips in frequency, phase, amplitude and time; and (ii) for each strip, filtering the strip, up-sampling the strip and placing the strip into a correct relative frequency position based on the plurality of aligned filters used in the transmitter.

In this exemplary embodiment, after up-sampling and frequency alignment, a plurality of resulting samples are interleaved and fed to a LN-LMS equalizer to create an initial waveform burst which was transmitted.

According to still another aspect of the present invention, a communications apparatus includes a transmitter and a receiver. In this exemplary embodiment, the transmitter is designed to: (i) create a base waveform burst as the carrier; (ii) create multiple channelizers with aligned filters; (iii) channelize the base waveform burst using the channelizers; and (iv) distribute the strips resulting from the channelizing across multiple time slots and frequencies. In this exemplary embodiment, the receiver is designed to: (i) align received strips in frequency, phase, amplitude and time; (ii) for each strip, filter the strip, up-sample the strip and place the strip into a correct relative frequency position based on the plurality of aligned filters used in the transmitter; and (iii) interleave and feed a plurality of resulting samples to a LN-LMS equalizer to create an initial waveform burst which was transmitted.

In this exemplary embodiment, the transmitter may use matched polyphase filter bank channelizers to channelize the base waveform burst, which has a single carrier frequency.

In this exemplary embodiment, to channelize and distribute the transmitter channelizes a single-carrier based waveform in such a way that each individual channel has a bandwidth well below a Nyquist rate for any information carried by the base waveform, thereby making full data extraction from any individual channels a theoretic impossibility.

In this exemplary embodiment, the resulting individual channels do not carry enough information from the base waveform to be useful and only in the aggregate can an entire base waveform be reconstructed.

In this exemplary embodiment, the transmitter up-converts a plurality of individual channels onto a plurality of pseudo-randomly chosen carrier frequencies within a bandwidth of a high rate hardware IF in such a way as to obfuscate an order in which they occur in the base waveform.

According to still another aspect of the present invention, an exemplary embodiment of a communications apparatus includes a transmitter with a signal generator to create a base waveform burst as a carrier signal. The transmitter also includes matched polyphase filter bank channelizers to channelize the carrier signal into strips such that each individual strip has a bandwidth well below a Nyquist rate for information carried by a base waveform, making full data extraction from said individual channels a theoretic impossibility. The transmitter also includes pseudo random IF upconverters to upconvert the strips into predetermined carrier frequencies within a desired bandwidth of the transmitter in a pseudorandom manner to obfuscate an order in which the strips occur in the base waveform to form an output carrier signal. The transmitter also has an IF output to output the output carrier signal.

In this exemplary embodiment, the apparatus may include a receiver to: (i) align received strips in frequency, phase, amplitude and time; (ii) for each strip, filter the strip, up-sample the strip and place the strip into a correct relative frequency position based on the aligned filters used in the transmitter; and (iii) interleave and feed a plurality of resulting samples to a LN-LMS equalizer to create an initial waveform burst which was transmitted.

In this exemplary embodiment, the transmitter may use matched polyphase filter bank channelizers to channelize the base waveform burst, which has a single carrier frequency. In this exemplary embodiment, the resulting individual channels do not carry enough information from the base waveform to be useful and only in the aggregate can an entire base waveform be reconstructed.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 15 depicts an exemplary embodiment of a channelizer according to yet another aspect of the present invention with N=5 strips.

DETAILED DESCRIPTION

According to one aspect of the present invention, the distributed carrier technique disclosed herein can be implemented as an independent process from the remaining transmitter/receiver processes. In one exemplary embodiment of a method for communicating, the exemplary embodiment of the distributed carrier takes a single-carrier base waveform, divides up the waveform in frequency, and then redistributes the subcarriers in a pseudo random order and channel assignment.

Figure 15:
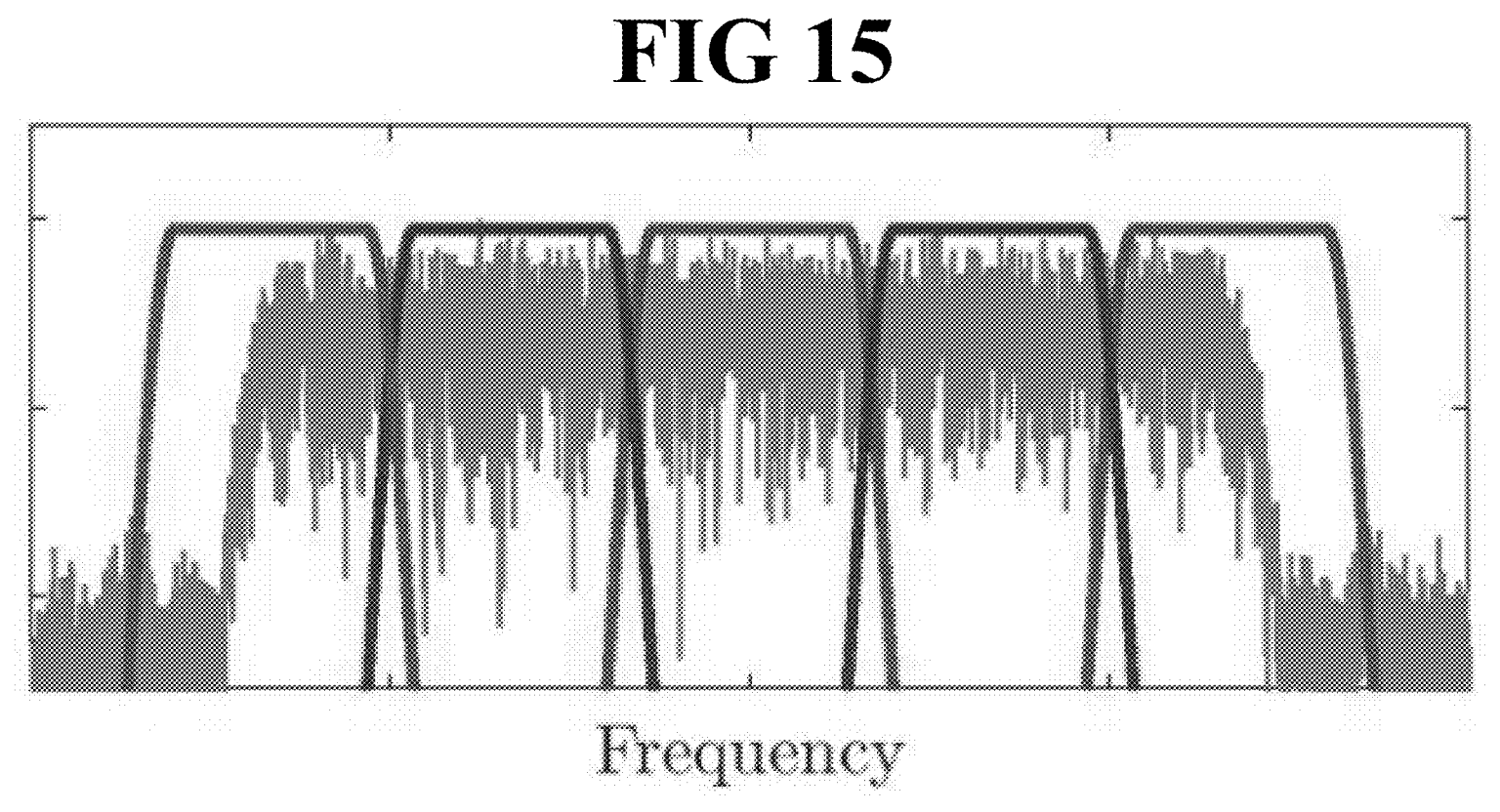

The frequency stripping process can be accomplished by using multiple matched polyphase filter bank channelizers on the single-carrier base waveform. FIG. 15 shows a frequency domain representation of the stripping process. FIG. 15 shows the channelizer illustration with N=5 strips.

The fundamental premise of the Distributed Carrier (DC) concept is to channelize a single high data rate waveform in such a way that each individual channel has a bandwidth well below the Nyquist rate for the information carried by the base waveform, making full data extraction from the individual channels a theoretic impossibility. Thus, the individual channels do not carry enough information from the base waveform to be useful and only in the aggregate can the entire base waveform be reconstructed by the receiver. After generation, the individual channels are up-converted onto pseudo-randomly chosen carrier frequencies within the bandwidth of the high rate hardware IF in such a way as to obfuscate the order in which they occur in the base waveform.

Figure 16:
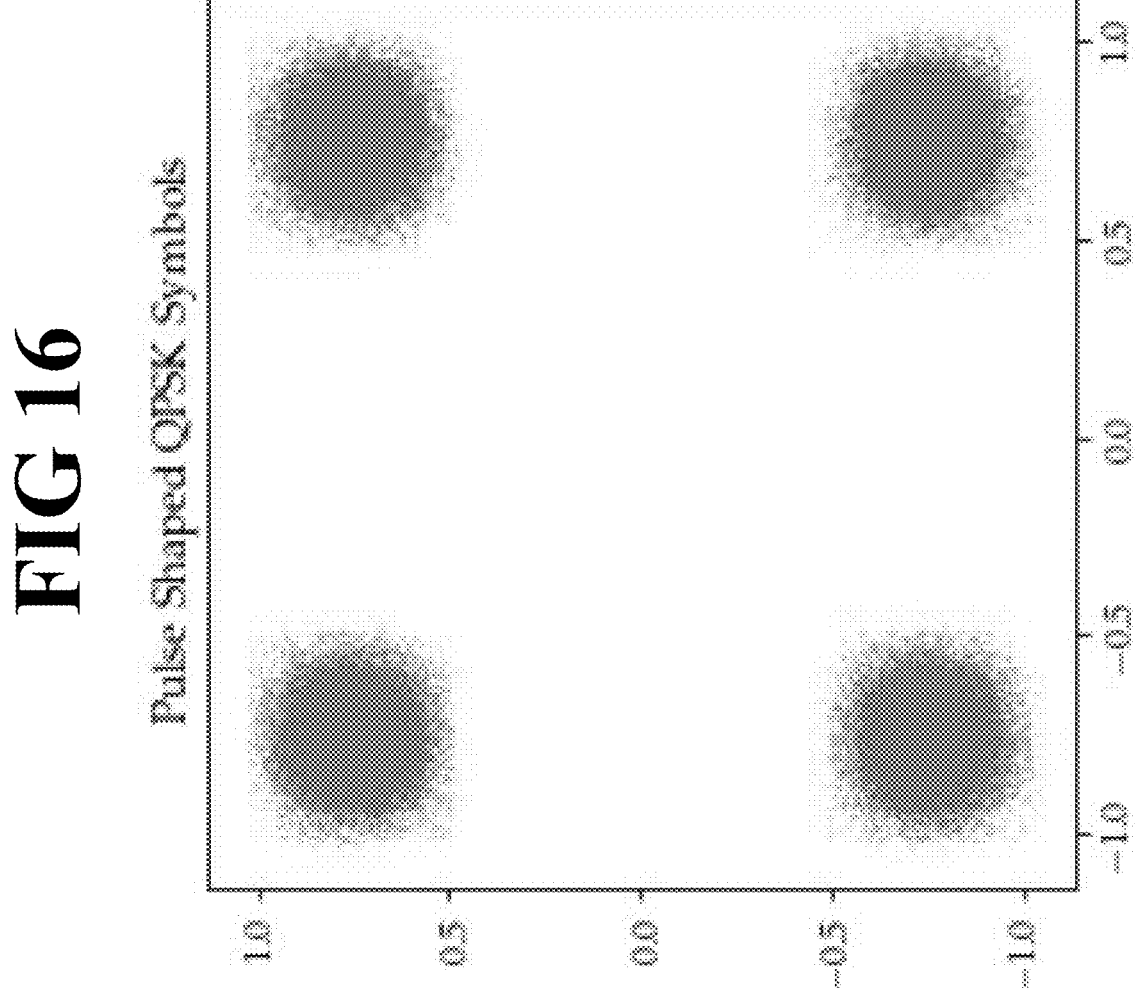
FIG. 16 depicts an exemplary embodiment of a two channel channelization of the present invention showing the Pulse Shaped QPSK Symbols.
Figure 17:
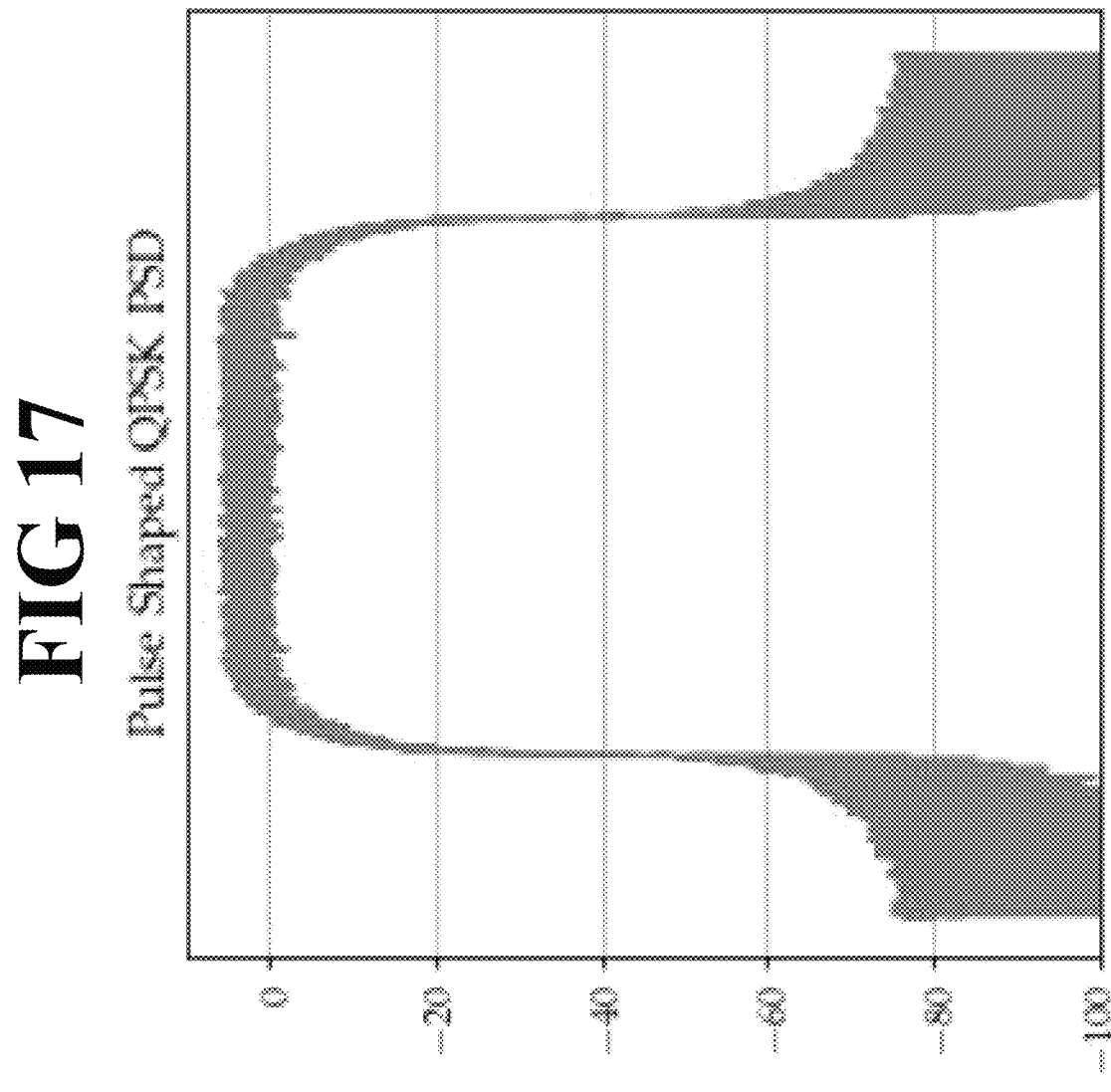
FIG. 17 depicts an exemplary embodiment of a two channel channelization of the present invention showing the Pulse Shaped QPSK Power Spectral Density (PSD).
Figure 18:
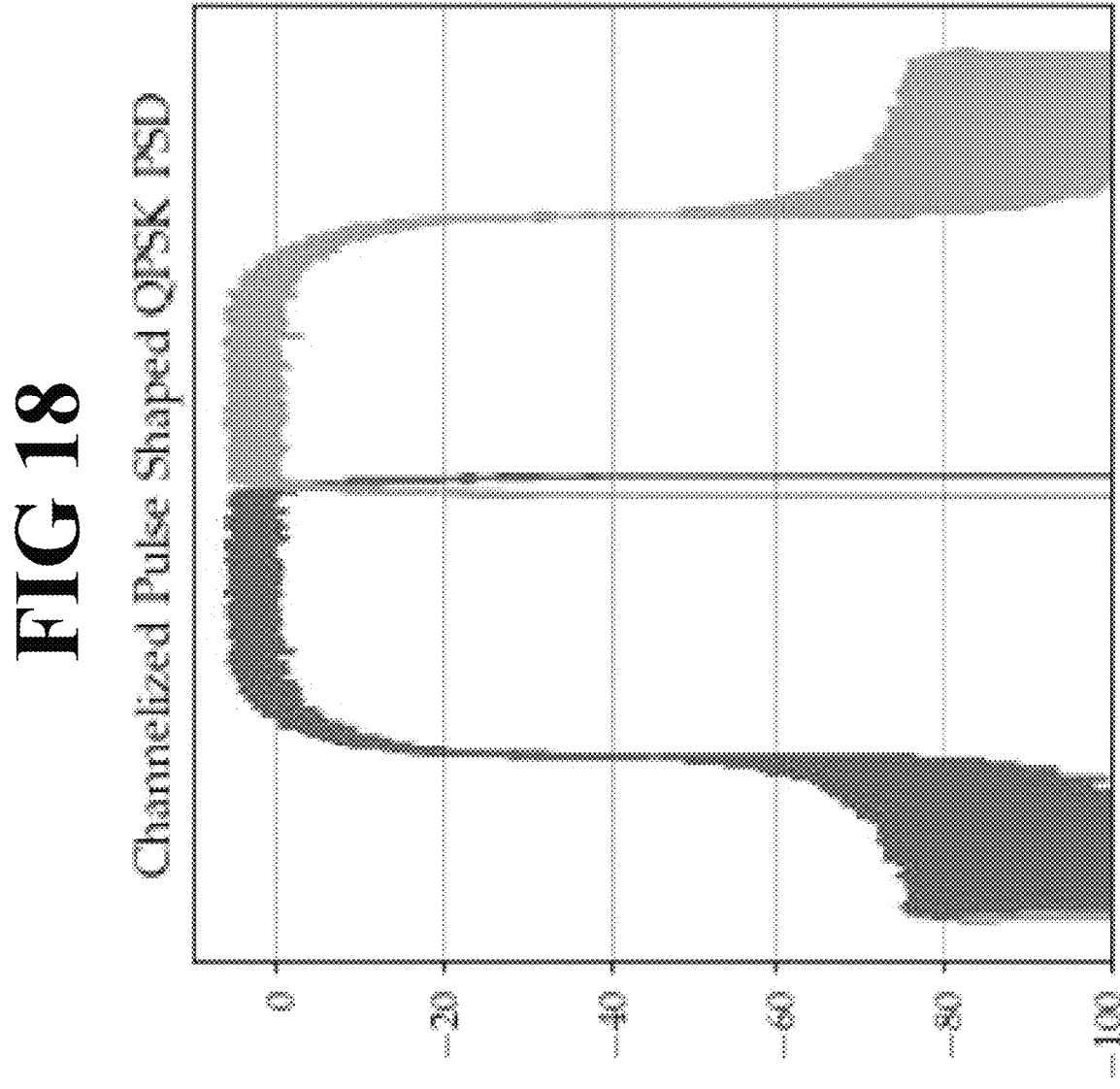
FIG. 18 depicts an exemplary embodiment of a two channel channelization of the present invention showing the Channelized Pulse Shaped QPSK PSD.
Figure 19:
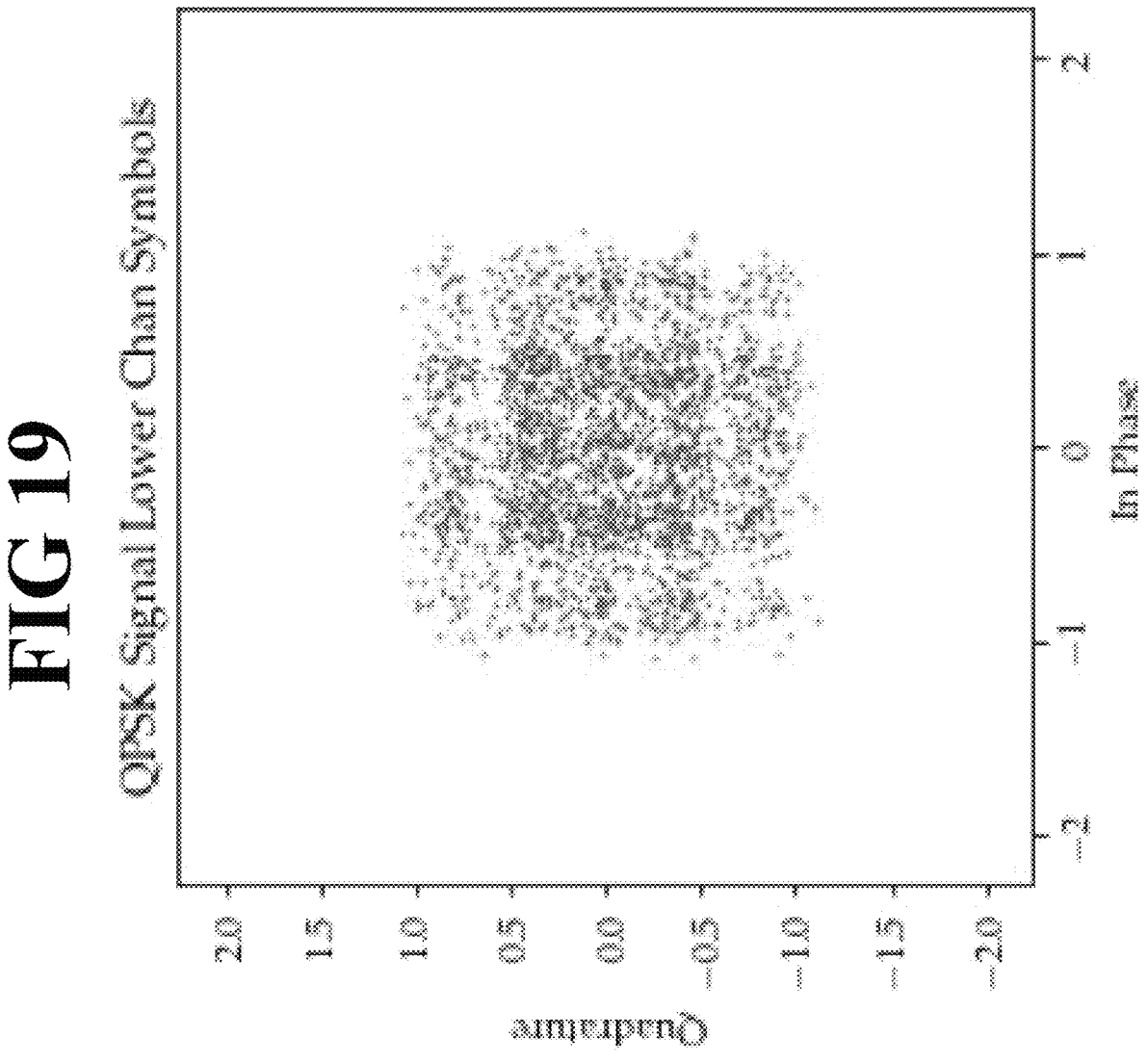
FIGS. 19-24 depict a comparison of the two signals from FIGS. 16-18 with the lower channels' symbols in FIGS. 19 and 22, the upper channels' symbols in FIGS. 20 and 23 and the sum of the lower and upper channels' symbols in FIGS. 21 and 24 all being shown with the QPSK signal in FIGS. 19-21 and a contrived signal in FIGS. 22-24 according to yet another aspect of the present invention.
Figure 20:
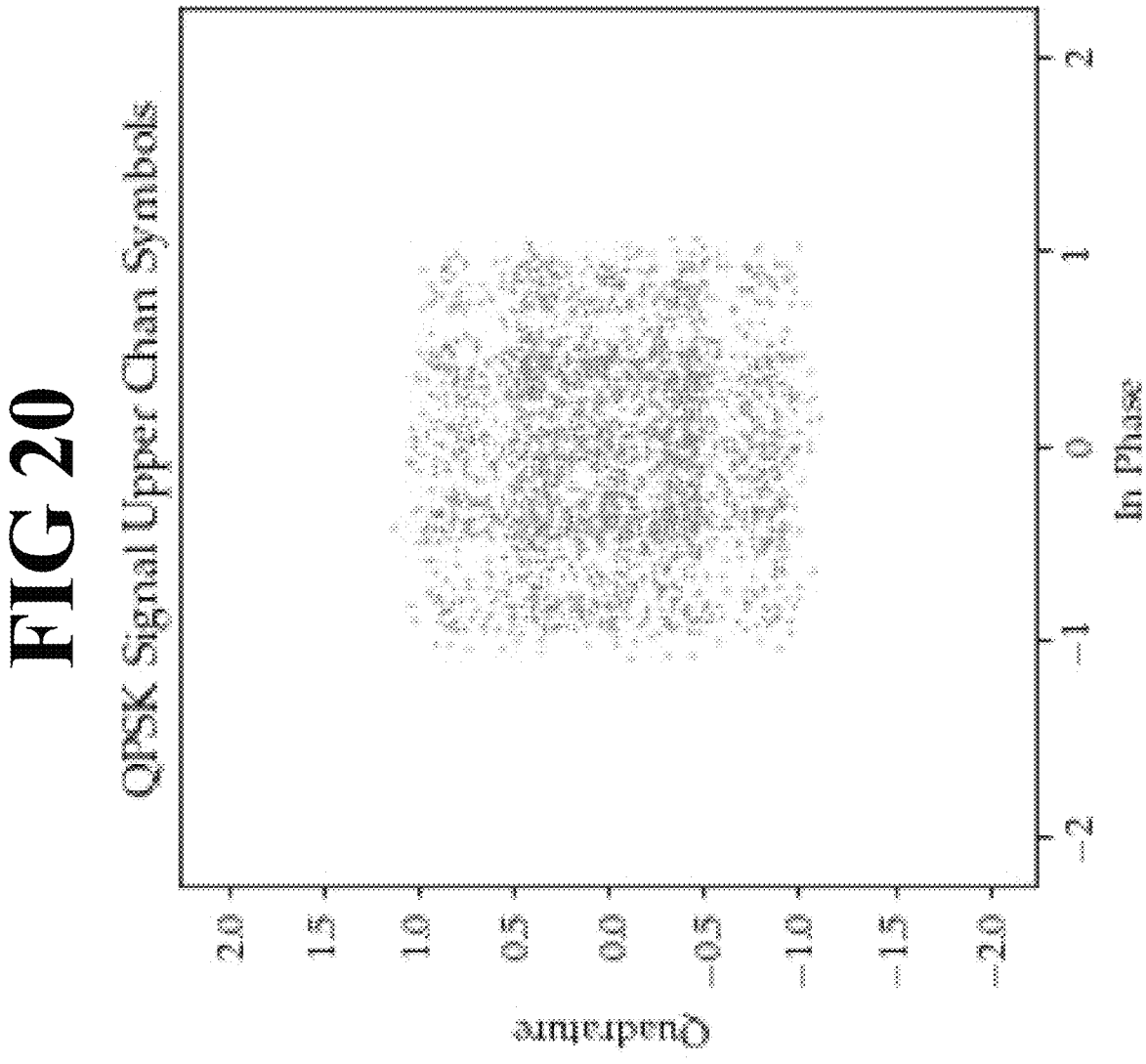
Figure 21:
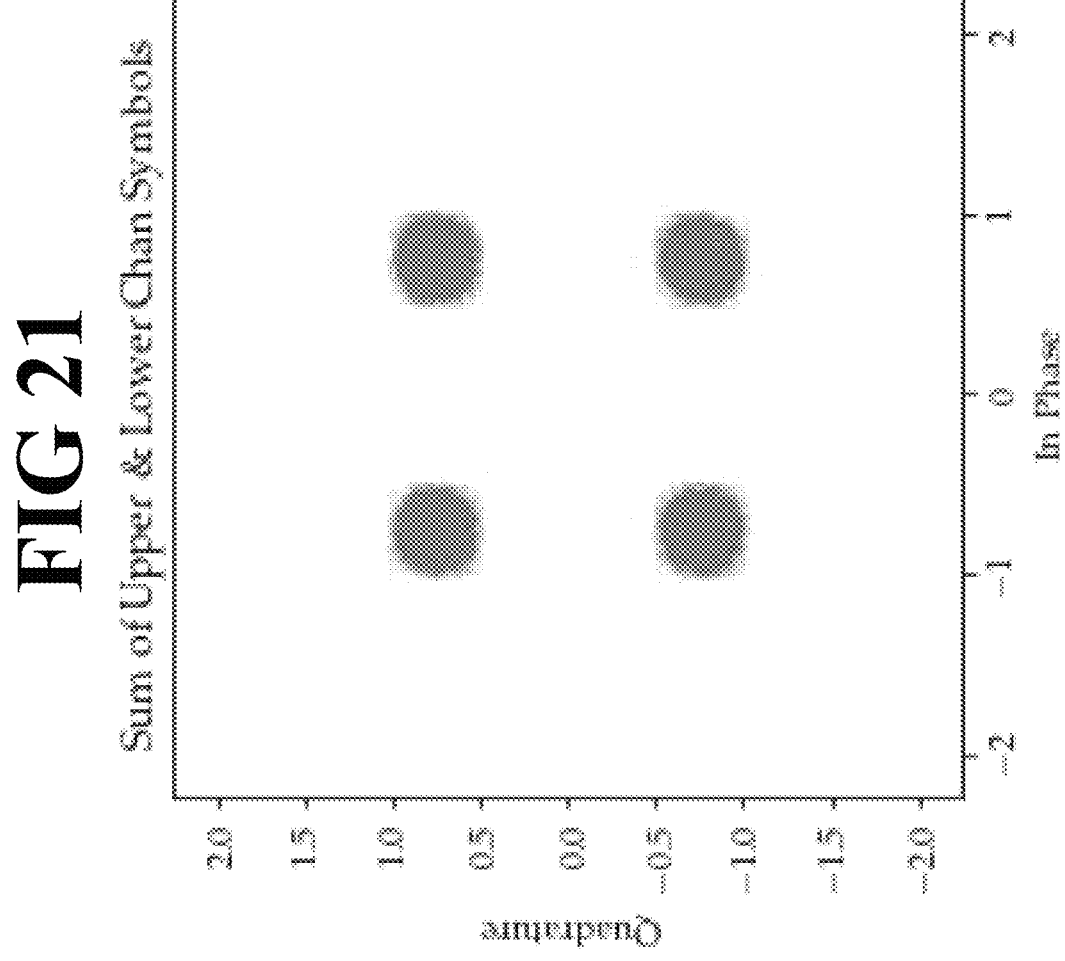
Figure 22:
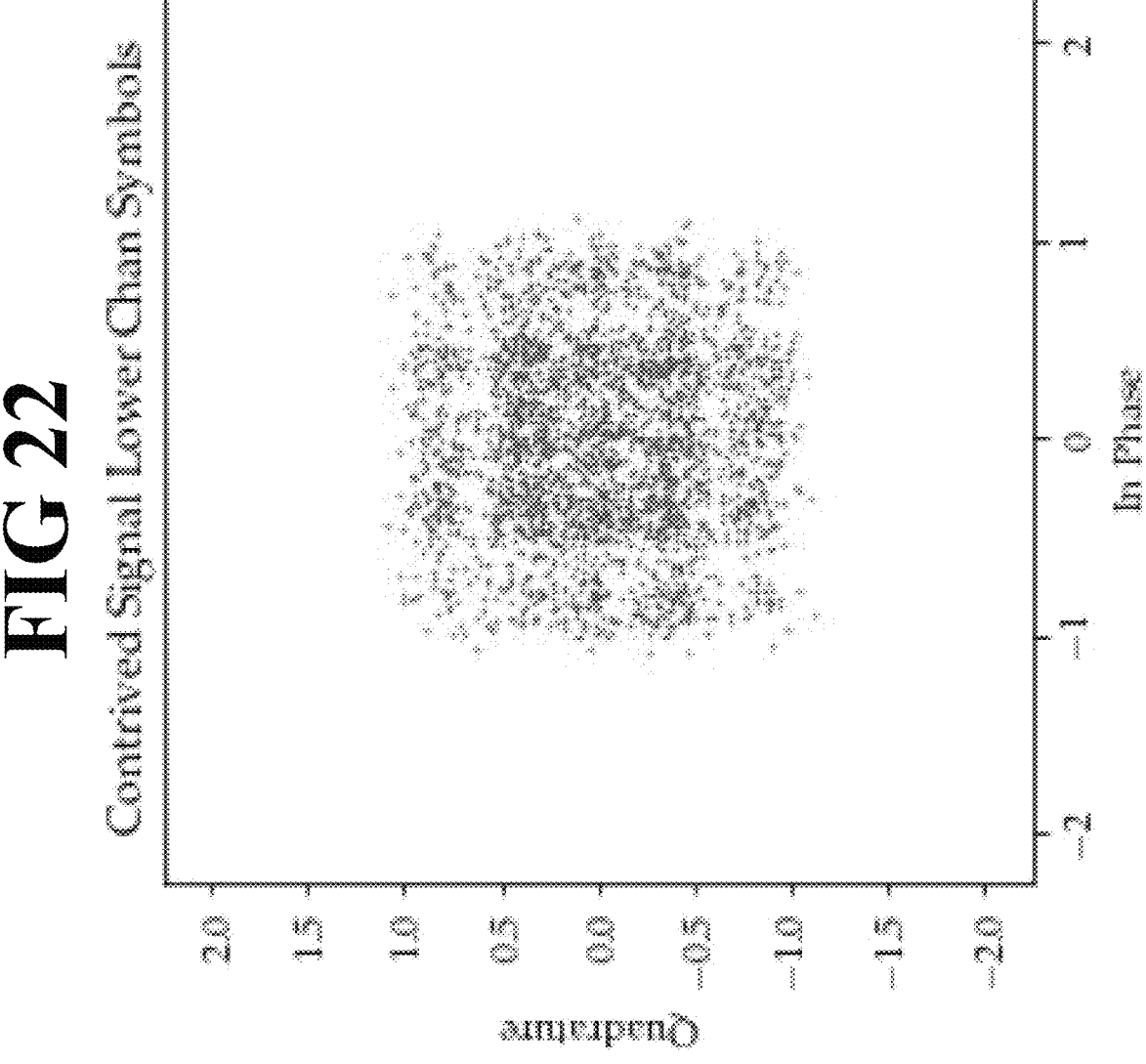
Figure 23:
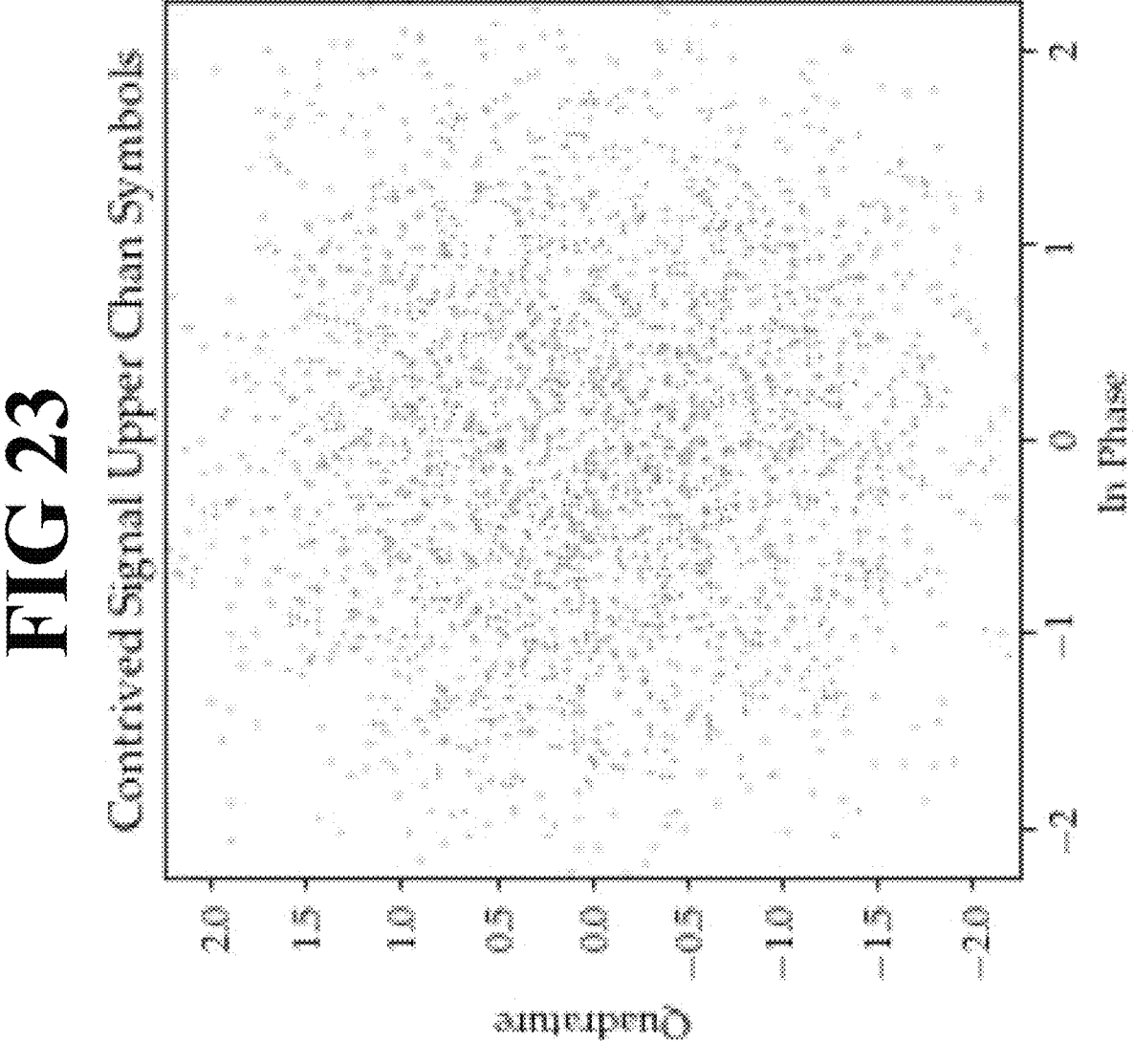

A simple but albeit contrived example will help demonstrate the security offered by fragmenting a signal in frequency by showing that two very different signals may have a common subset of channels. We begin with a standard QPSK created using a Root-Raised Cosine pulse shaping filter with a 25% excess bandwidth. Apply the simplest possible channelization—two channels—as shown in FIGS. 16-18. We can see the channelization (FIG. 18) along with the original pulse shaped QPSK symbols (FIG. 16) and PSD (FIG. 17). This is a simple demonstration. A second signal is created which exactly matches the first signal in its lower channel. The lower channel is untouched other than negligible edge filtering effects and rounding errors. A comparison of the two signals is shown in FIGS. 19-24 with the lower channels' symbols (FIGS. 19 and 22), upper channels' symbols (FIGS. 20 and 23) and sum of the lower and upper channels' symbols (FIGS. 21 and 24) all being shown with the QPSK signal in the plots in FIGS. 19-21 and the contrived signal in the plots in FIGS. 22-24. Only a subset of the two signals' lower and upper channels is shown to aid in comparison via visual inspection in the plots in FIGS. 19, 22 and FIGS. 20, 23, respectively. For the sums of the lower and upper channels, the full symbol sets are shown in the plots in FIGS. 21 and 24. It can be verified that the lower channels are the same, but the upper channels differ completely and therefore their sums differ as well.

Figure 24:
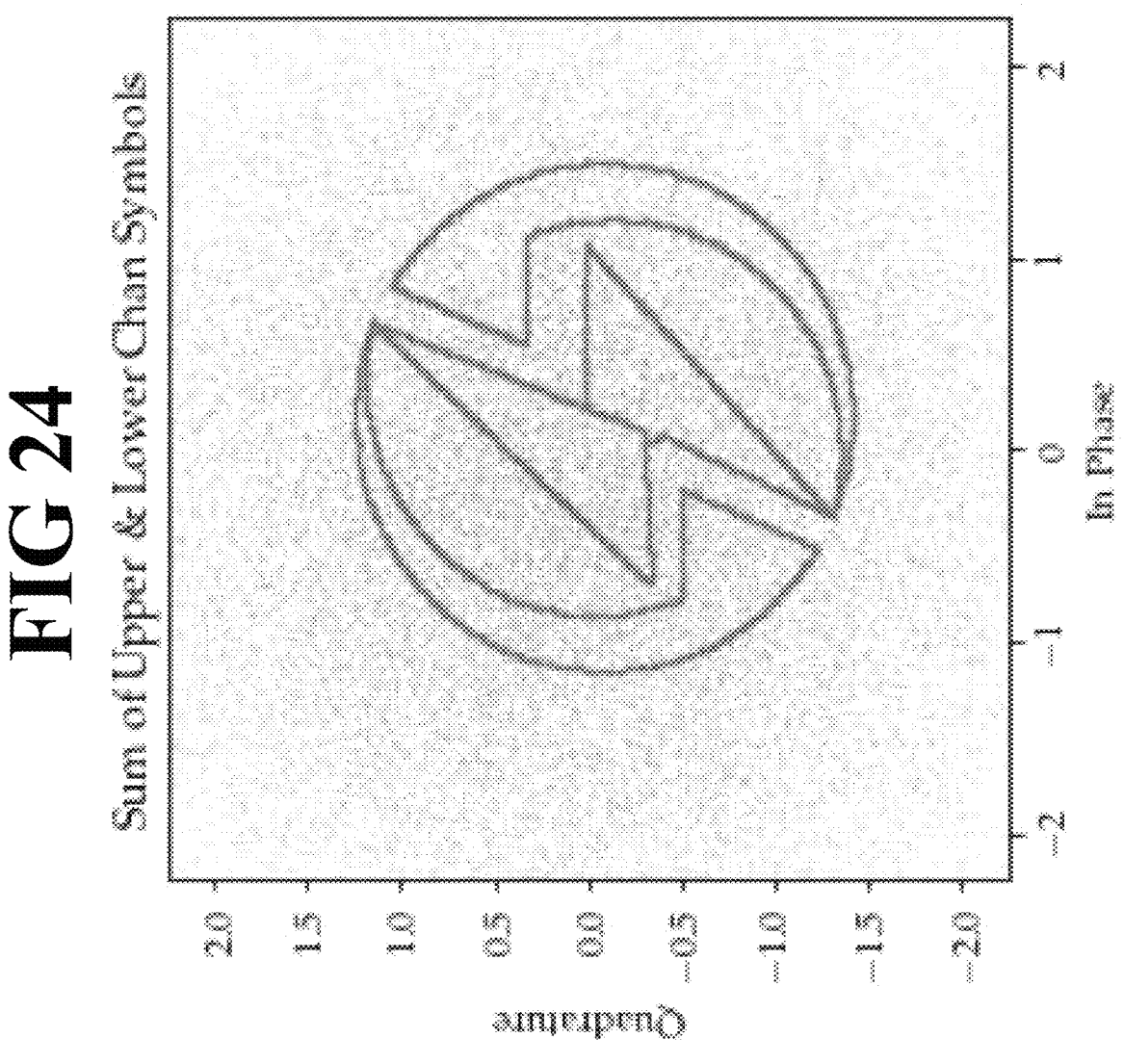

In the contrived signal, every other symbol was precisely controlled in order to produce the symbol pattern shown in the plot of FIG. 24. To clarify what this example illustrates, when a signal is channelized using the DC technique, each individual channel could have come from infinitely many different signals meaning that no single channel contains enough information to extract the base waveform's information. Therefore, to demodulate the base waveform and know that the demodulated symbols are correct, the channels must be received and arranged into their proper relative frequency positions before demodulating the base waveform.

With frequency modulation schemas, whether they employ multiple carriers like OFDM or single carriers like MFSK, the sub-bands contain some independent extractable information that could be recovered by an adversary.

Figure 25:
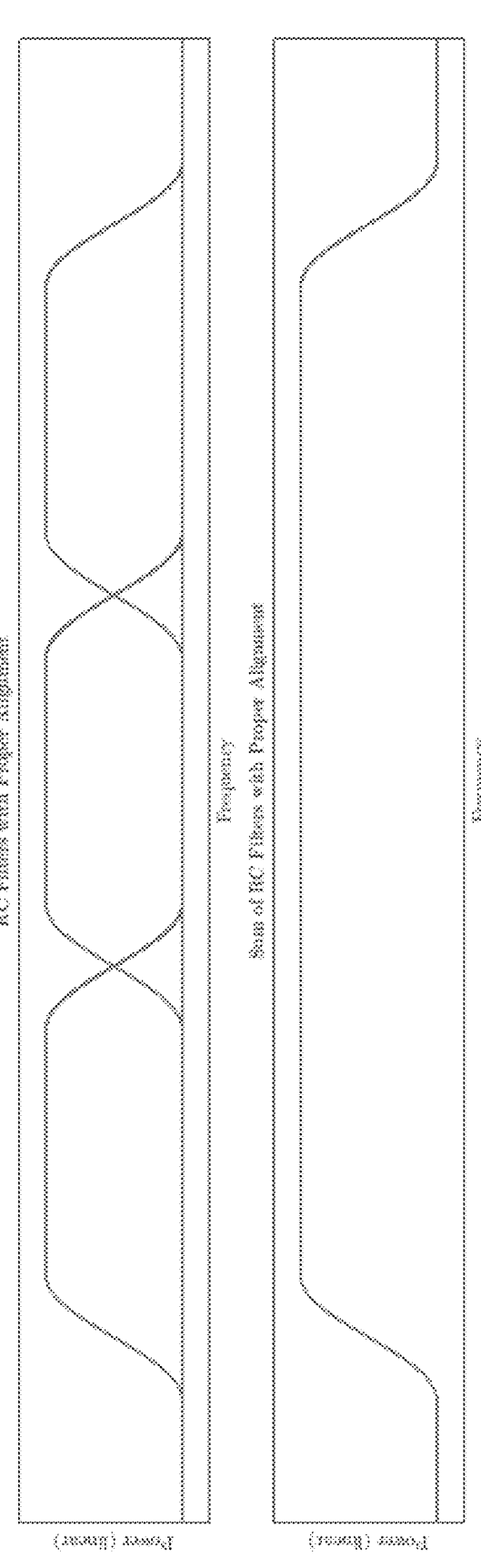
FIG. 25 depicts a sum of properly aligned RC filters is an RC filter according to still another aspect of the present invention.
Figure 26:
FIG. 26 depicts the power spectral densities of the distributed carrier along with proper realignment and reconstruction according to yet another aspect of the present invention.

For example, in OFDM, any subset of the subcarriers can be demodulated, and the information extracted, revealing some portion of the signal's payload. This is not the case with PSK and QAM modulation schemas where information is spread across the entire signal's bandwidth in a dependent manner. The use of the Distributed Carrier modulation scheme takes advantage of this property. As explained, each channel is upconverted to a different pseudo-randomly chosen carrier frequency and multiple carriers are employed in each hop time with demodulation requiring individual channels to be realigned in time, amplitude, frequency, and phase. To illustrate the complexity of proper realignment, if 20 channels are used then there are over 2.4 quintillion (2.4E18) combinations of channel arrangements possible. While not the only valid option, the system may employ channelizers which use Raised Cosine (RC) filters to provide strips that can be reconstructed into the signals. These were chosen because of the property that when properly aligned in time, amplitude, phase and frequency, multiple RC filters sum to make a single filter. FIG. 25 shows this alignment and summation while FIG. 26 shows the PSDs of the full DC burst with its proper channel realignment and reconstruction.

The DC technique enables security through the fundamentals of communications theory. When multiple channels are employed, the bandwidth of each channel is well below the Nyquist rate required to send the information of the base waveform at its rate and the amount of information per channel decreases the more channels are employed. When a secure base waveform is used, the DC technique only adds additional levels of security.

Receiver Design

Figure 27:
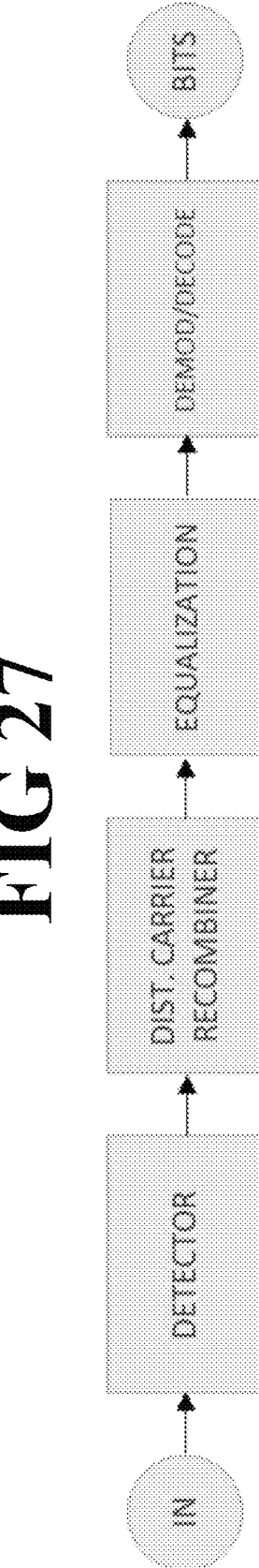
FIGS. 27-28 depict an exemplary embodiment of a receiver according to still another aspect of the present invention.
Figure 28:
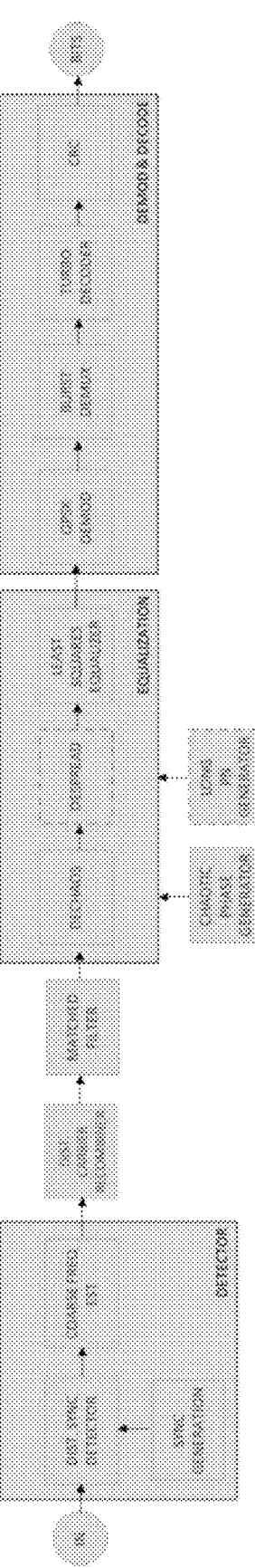

An exemplary embodiment of a software based receiver is depicted in FIG. 27. The software based receiver depicted in FIG. 27 was simulated using Python and X-Midas. Turning to FIG. 28, shown therein are details of the detector and the distributed carrier recombiner of the present invention. The receiver ingests oversampled pre-demodulated (pred) complex baseband samples. The detector searches for the Distributed Sync waveform in the received signal to establish burst timing. Following the acquisition stage, the receiver filters and retunes each carrier from the Distributed Carrier modulation waveform. The retuned carriers are matched filtered using a custom pulse shape filter. Following the matched filter in FIG. 28, the signal proceeds to equalization and demodulation/decoding.

Figure 29:
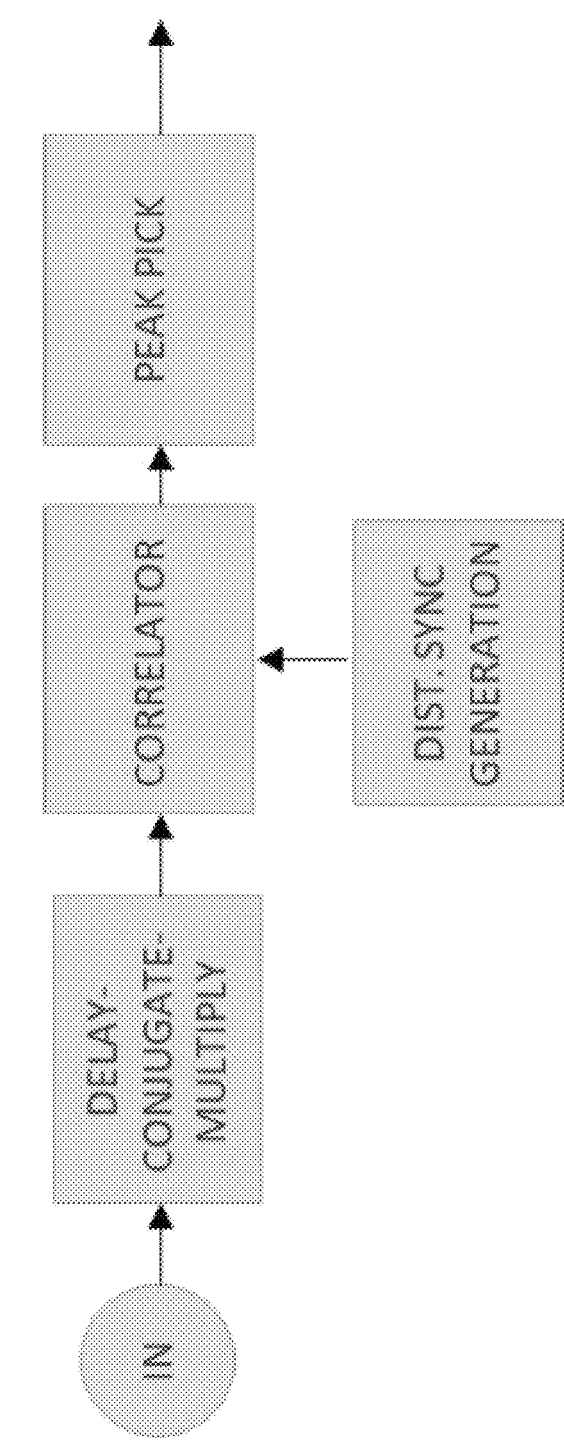
FIG. 29 depicts an exemplary embodiment of a detector according to yet another aspect of the present invention.

The receiver exploits properties of the Distributed Sync waveform to perform efficient wideband signal detection in low SWaP hardware. To perform signal detection the receiver generates a matched filter by upsampling the Distributed Sync pattern to the sample rate of the input signal. The input signal then goes through a delay-conjugate-multiply (DCM) operation. The output of the DCM is cross correlated with the matched filter. Peaks in the output of the cross correlation indicate the sample time offset of the start of the Distributed Sync waveform. The detector provides a time of arrival (TOA) and frequency of arrival (FOA) estimate for downstream processing. FIG. 29 is a functional block diagram of the detector.

Figure 30:
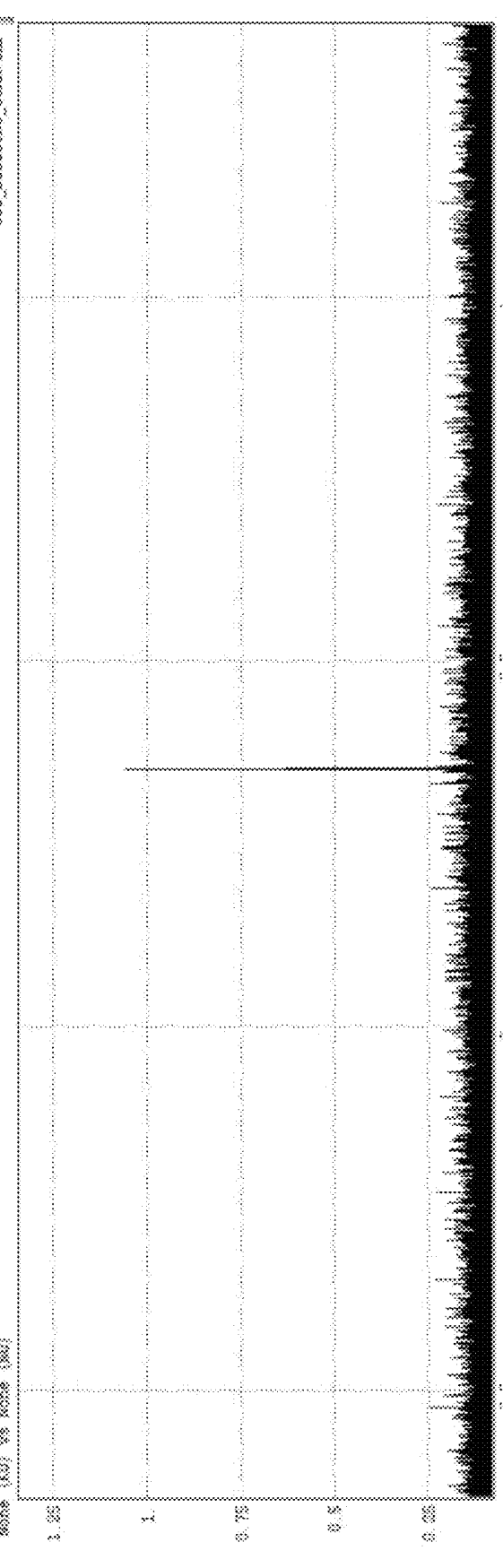
FIG. 30 depicts a plot from an output of the detector in FIG. 29 for a waveform with 9 dB received SNR without any knowledge of the signal center frequency.

Using the Distributed Sync for signal detection provides compelling advantages over synchronization sequences (i.e., preambles, acquisition sequences) found in traditional communications systems. The Distributed Sync has unique properties such that the DCM operation on the input signal allows for signal detection with an arbitrarily large carrier frequency offset (CFO). Traditional communication systems require a two-dimensional search in both the time domain and frequency domain to perform signal detection. This two-dimensional signal search is computationally expensive and often the most resource intensive aspect of a receiver. FIG. 30 is a plot from the output of the detector for a waveform with 9 dB received SNR without any knowledge of the signal center frequency.

Figure 31:
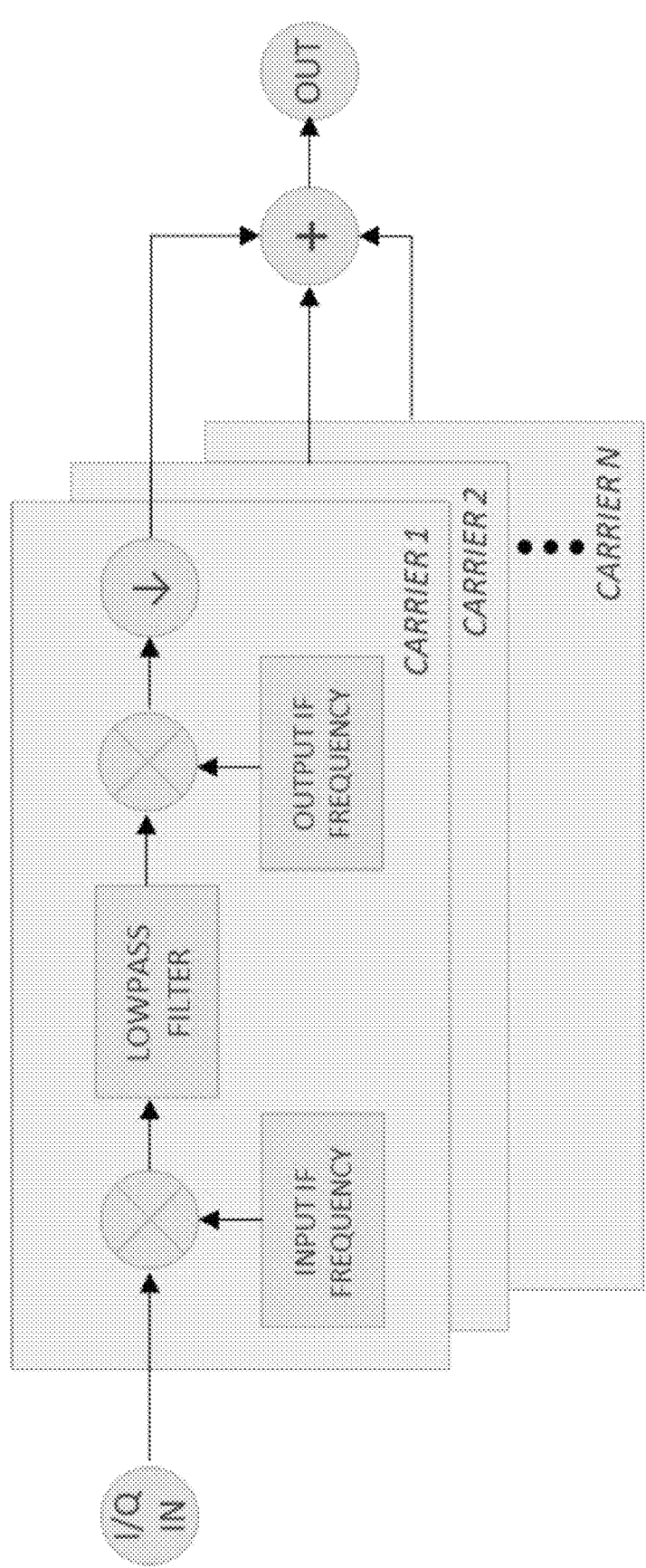
FIG. 31 depicts a block diagram of an exemplary embodiment of a distributed carrier recombining process according to yet another aspect of the present invention.

Once the burst sample timing is established from the detector, the Distributed Carriers are recombined to form a single composite waveform. Each sub-channel of the Distributed Carrier is tuned from an "input IF frequency" to baseband. The signal is low pass filtered, decimated, and then re-tuned to an output IF frequency that corresponds to its original frequency location prior to channelization from the Distributed Carrier modulation process. FIG. 31 is a block diagram of the steps performed on each carrier. The retuned carriers are used as inputs into the joint equalization process which results in a single composite baseband waveform at the symbol rate.

Figure 32:
FIG. 32 shows the PSDs for an exemplary waveform fragmented into seven carriers (top subplot), then re-tuned to its appropriate baseband frequency (middle plot) and then the output composite baseband waveform (bottom subplot) after recombining.

FIG. 32 shows the PSDs for an exemplar waveform fragmented into 7 carriers (top subplot), then re-tuned to its appropriate baseband frequency (middle plot), and then the output composite baseband waveform (bottom subplot) after recombining.

The following Detailed Description includes Python/JupyterLab code to demonstrate the basic concepts described in this application.

The following code block initializes a Jupyter Notebook. If a simple Python script will be used instead, minor adjustments may be required for the following code blocks.

```
#Notebook initialization
% matplotlib inline
import numpy as np
import commpy as cp
import dspftwplot as dp
import scipy.signal as ss
import matplotlib as mpl
import matplotlib.pyplot as plt
from matplotlib import collections as mc
pltscl=1.5
```

Conceptual Introduction

The idea stems from the very basic fact that the summation of a real sinusoid with itself offset by half a cycle is zero (0). Formulaically we have:

$$\cos(2\pi\alpha x + \rho) + \cos\left(2\pi\alpha\left(x + \frac{1}{2\alpha}\right) + \rho\right) = \cos(2\pi\alpha x + \rho) + \cos(2\pi\alpha x + \rho + \pi)$$

$$= \cos(2\pi\alpha x + \rho) + \cos(2\pi\alpha x + \rho)\cos(\pi) - \sin(2\pi\alpha + \rho)\sin(\pi)$$

$$= \cos(2\pi\alpha x + \rho) - \cos(2\pi\alpha x + \rho)$$

$$= 0$$

Figure 1:
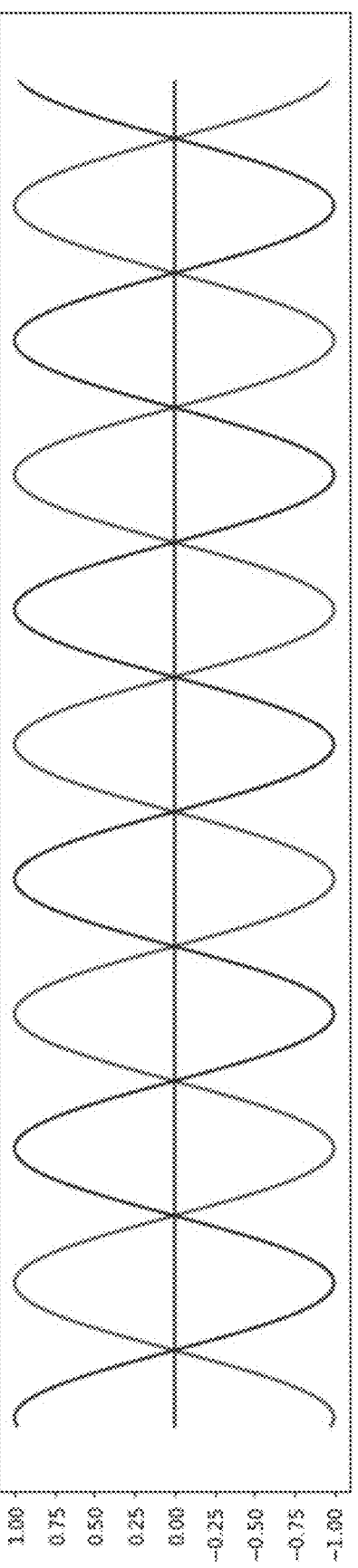
FIG. 1 depicts a plot showing that a summation of a real sinusoid with itself offset by half a cycle is zero.

Graphically speaking we can see this simple idea as well as shown in FIG. 1, in which the two real sinusoids sum to cancel out each other.

```
plt.close("all")
plt.figure(tight_layout=True, figsize=(8*pltscl, 2*pltscl))
rho=np.random.rand (1)*2*np.pi
X=np.arange(500)/100
f=np.cos(2*np.pi*x+rho)
g=np.cos(2*np.pi*(x+0.5)+rho)
plt.plot(x, f, 'r', x, g, 'b', x, ftg, 'purple')
plt.gca( ).set(xticks=[ ]);
```

The previous code block plots two real sinusoids matched in amplitude and frequency and offset by exactly ½ cycle in phase. With this precise offset, the sum is also plotted in the horizontal line in the middle.

Figure 2:
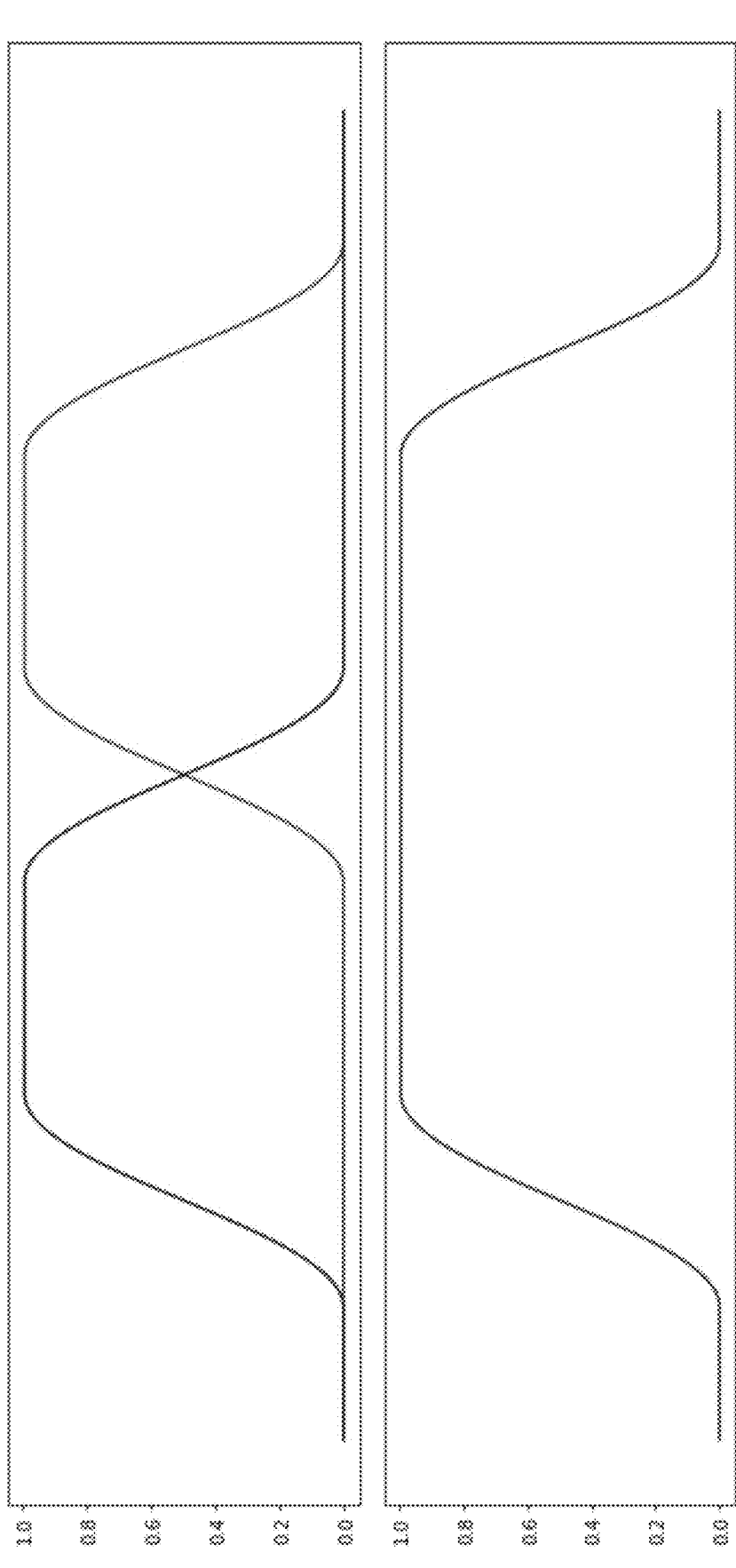
FIG. 2 depicts a plot showing two identical raised cosine filters each described by the same parameters, then centered apart in the top plot, with their sum in the bottom plot.

We can translate this observation into a property about the sum of properly aligned matching Raised Cosine filters in the following way. If we are given two identical raised cosine filters each described by the parameters $$F = \frac{1}{T} \text{ Hz}$$

and α, then it we center them exactly F Hz apart and sum them, the result will be a raised cosine filter with parameters 2F Hz and α/2. This can be seen graphically in FIG. 2, the top plot of which shows the two filters separately and the bottom plot shows them summed together. It should be noted that proper alignment can be achieved with non-matching raised cosine filters but for our purposes, we will assume they are matched.

```
alpha=0.5
F=0.32
n=1000
tone=np.exp(1J*2*np.pi*F/2*np.arange(n))
f=cp.rcosfilter(1000, alpha, 1/F, 1) [1]/np.pi
F_hi=np.abs(np.fft.fftshift(np.fft.fft(f*tone)))
F_lo=np.abs (np.fft.fftshift(np.fft.fft(f*tone.conj( )))
plt.close("all")
plt.figure(tight_layout=True, figsize=(8*pltscl, 4*pltscl))
plt.subplot(2,1,1)
plt.plot(F_hi, 'r', F_lo, 'b')
plt.gca( ).set(xticks=[ ])
plt.subplot(2,1,2)
plt.plot(F_hi+F_lo, 'purple')
plt.gca( ).set(xticks=[ ]);
```

The previous code block creates two identical raised cosine filters and off-tunes them by precisely the filter bandwidth, thus aligning falling transition band edge of the lower frequency filter and the rising transition band edge of the higher frequency filter. With those properly aligned, the sum is taken and shown as well.

We apply this concept to a signal in order to break it into pieces that can be put back together in both the time and frequency domains. We begin by demonstrating this concept in the frequency domain.

Frequency Division and Dispersion

Figure 3:
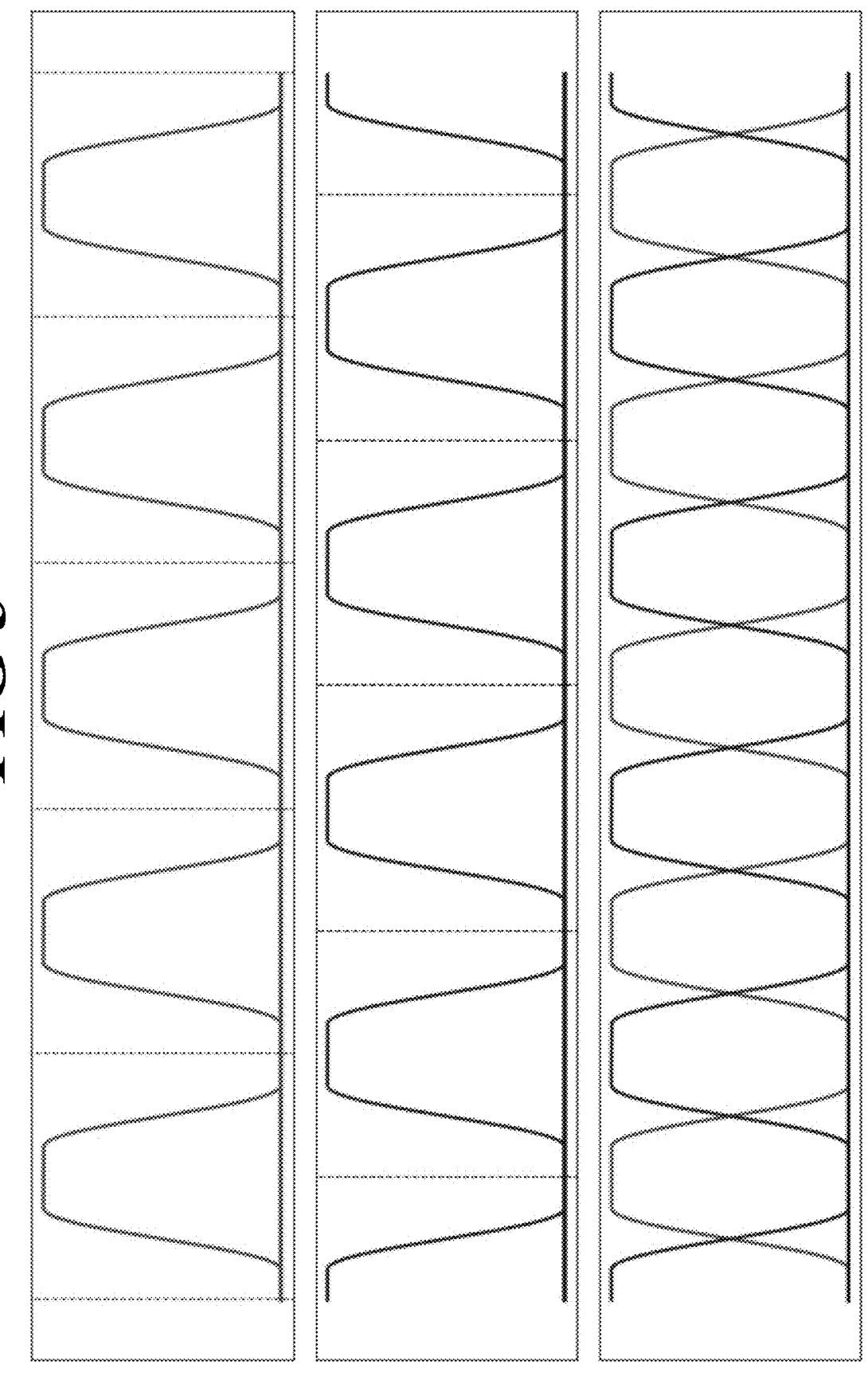
FIG. 3 illustrates an overlap of frequencies with channelizer filters and channel boundary lines.

The main idea behind frequency division and dispersion is to tile the total bandwidth of a signal using matched and shifted raised cosine filters which allow the signal strips to be recombined after reception. The strips are sent using various time or frequency sets. In order to divide a signal in this manner, we'll employ two Polyphase Filter Bank Channelizers (PFBC) whose filters are matched raised cosine filters with bandwidths half that of the output channel's size and whose inputs are shifted in frequency by half the bandwidth of the output channels as well. The plot in FIG. 3 illustrates the overlap of the frequencies with the channelizer filters being color coded and channel boundary lines being displayed as well.

```
bw=0.1
f_len=1000
f=cp.rcosfilter(f_len, 0.5, 1/bw, 1) [1]*bw
F=np.abs(np.fft.fftshift (np.fft.fft(f)))
for i in range (1, int (1/bw)):
    tone=np.exp(1J*2*np.pi*i*bw*np.arange(len(f)))
    F=np.c_[F, np.abs(np.fft.fftshift(np.fft.fft (f*tone)))]
lines0=[ ]
lines1=[ ]
for i in range(0, int (1/bw)+1, 2):
    lines0.append([(i*f_len*bw, -0.1), (i*f_len*bw, 1.1)])
    lines1.append([((i+1)*f_len*bw, -0.1), ((i+1)*f_len*bw, 1.1)])
lc0=mc.LineCollection(lines0, linestyle="dashed", color="red", linewidth=1)
lc1=mc.LineCollection(lines1, linestyle="dashed", color="blue", linewidth=1)
plt.close("all")
plt.figure(tight_layout=True, figsize=(8*pltscl, 5*pltscl))
ax0=plt.subplot(3,1,1)
ax0.plot(F[:, 0::2], 'r', linewidth=2)
ax0.set(xticks=[ ], yticks=[ ])
ax0.add collection(lc0)
ax1=plt.subplot(3,1,2)
ax1.plot(F[:, 1::2], 'b', linewidth=2)
ax1.set(xticks=[ ], yticks=[ ])
ax1.add collection(lc1)
ax2=plt.subplot(3,1,3)
ax2.plot(F[:, 0::2], 'r', F [:, 1::2], "b", linewidth=2);
ax2.set(xticks=[ ], yticks=[ ]);
```

The previous code block creates the image for two properly aligned filter banks and shows their alignments when put together.

One can demonstrate this channelization using a simple QPSK burst. The following code and functions will create the signal and perform the channelizations.

```
#QPSK burst creation.
constl=np.exp(1J*2*np.pi*np.arange(1, 8, 2)/8)
syms=constl[np.random.randint(4, size=(10000))]
spb=2
psf=cp.rrcosfilter(spb*25+1, 0.35, spb, 1) [1]/spb
pt=np.pad(np.kron(syms,  np.r  [1,  np.zeros(spb-1)]),
    2000)
s=ss.convolve(pt, psf, "same")
sn=cp.awgn(s, 20)
```

The previous code block creates a burst of a QPSK signal at 2 samples per symbol using a Root Raised Cosine pulse shaping filter with an excess bandwidth of 35%.

Figure 4:
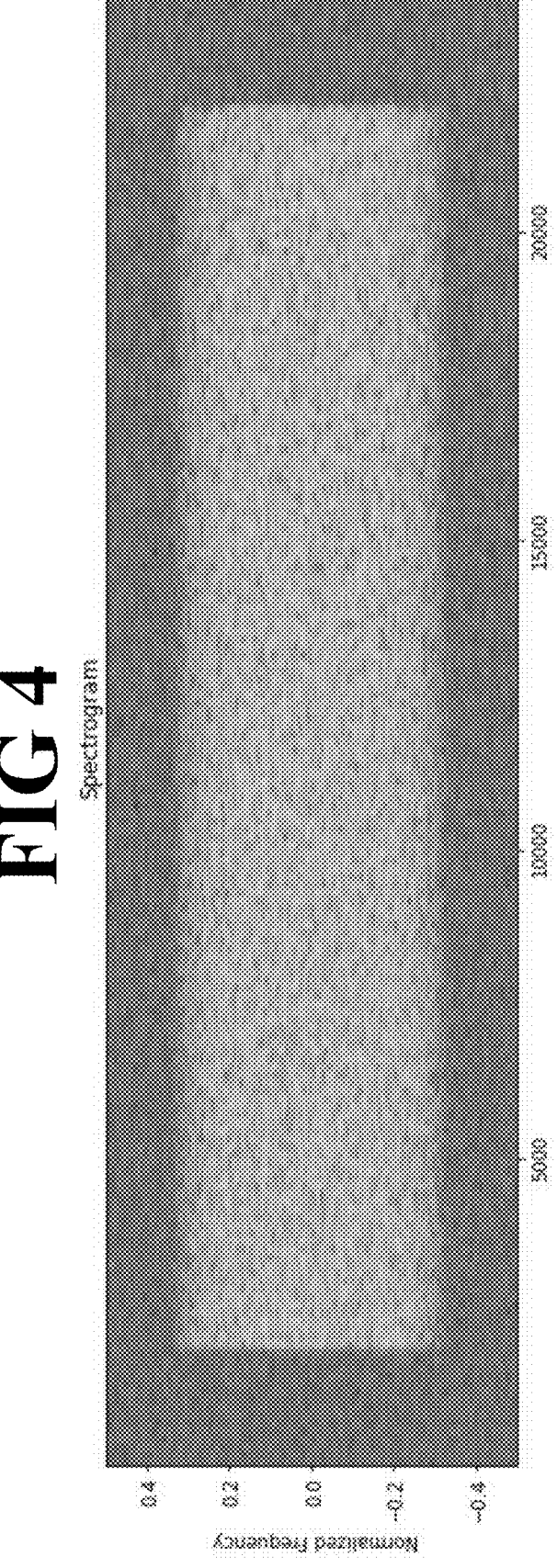
FIGS. 4-5 depicts a QPSK burst that was created with some noise added.
Figure 5:
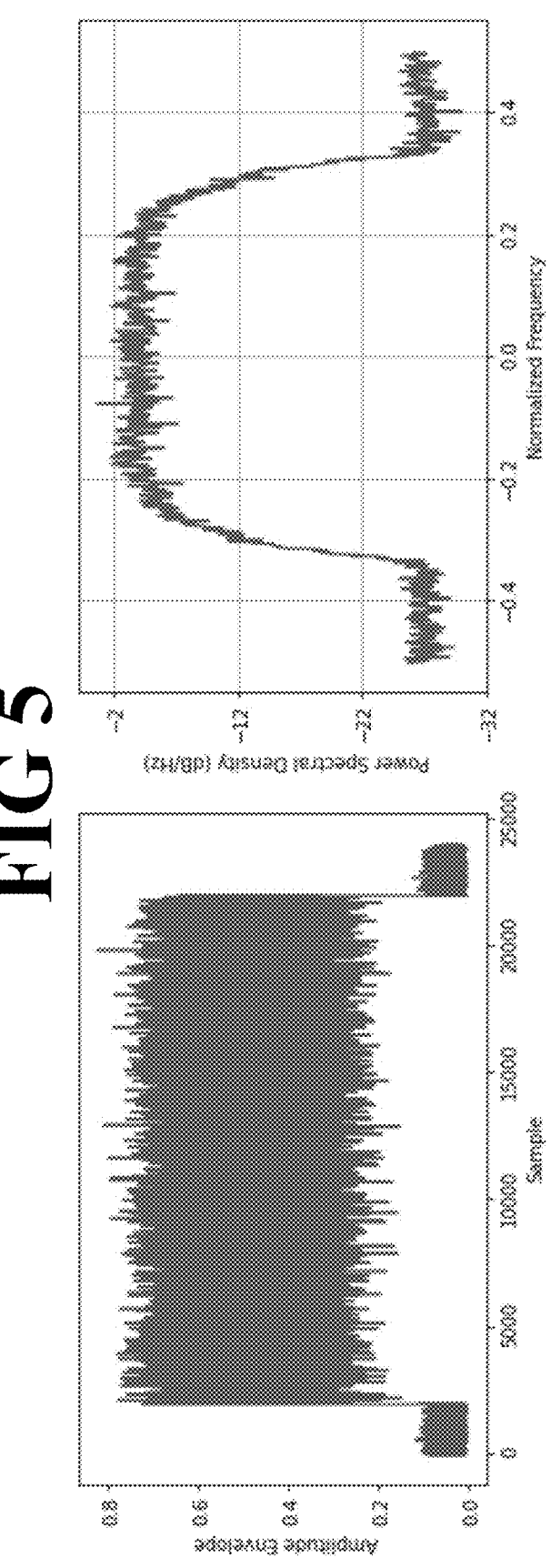

Note that the channel on the end will contain a frequency discontinuity because it contains the upper and lower frequency half channels put together. For convenience, we will remove this channel from our output. The plots in FIG. 4 and FIG. 5 show the QPSK burst that was created with some noise added simply for visual effect.

```
plt.close("all")
plt.figure(tight_layout=True, figsize=(8*pltscl, 5*pltscl))
ax0=plt.subplot(2,2, (1,2))
ax0.specgram(sn, Fs=1);
ax0.set(title="Spectrogram", ylabel="Normalized Fre-
    quency")
ax1=plt.subplot(2,2,3)
ax1.plot(np.abs(sn))
ax1.set(ylabel="Amplitude Envelope", xlabel="Sample")
ax2=plt.subplot(2,2,4)
ax2.psd(sn, Fs=1, NFFT=2**10);
ax2.set(xlabel="Normalized Frequency");
```

The previous code block plots the spectrogram of the QPSK burst, the amplitude envelope of the burst and the PSD of the burst.

The code below will create the different strips of a given input signal.

```
#Channelizer code
def create_strips(s, nstrips, alpha):
    nchans=nstrips//2
    s0=np.pad(s, (0, -len(s) & nchans))
    s1=s0*np.exp(1J*2*np.pi*(1/nstrips)*np.arange(len
        (s0)))
    s0r=s0.reshape(-1, nchans).T
    s1r=s1.reshape(-1, nchans).T
    filt=cp.rcosfilter(nchans*100, alpha, nchans*2, 1) [1]
    filtr=np.flip(filt.reshape(-1, nchans).T, axis=0)
    s0rf=np.empty_like(s0r)
    s1rf=np.empty_like(s1r)
    for i in range(s0rf.shape[0]):
        s0rf[i,:]=ss.convolve(s0r[i,:], filtr[i,:], "same")
        s1rf[i,:]=ss.convolve(s1r[i,:], filtr[i,:], "same")
    s0rff=np.fft.fftshift(np.fft.fft(s0rf, axis=0), axes=0)
    s1rff=np.fft.fftshift(np.fft.fft(s1rf, axis=0), axes=0)
    strips=np.roll(np.c_[s1rff, s0rff].reshape(-1, s0rf.shape
        [1]), -((nchans+1) % (2), axis=0)
    return strips[1:,:]
```

The previous code block is a function which creates the individual strips from a single input signal. In this particular instance, a Polyphase Filter Bank is used twice. Once with the original input signal and once with the original input signal tuned by half a channel bandwidth to give the proper alignment. The strip containing the frequency discontinuity is removed from the output.

For demonstration purposes, we apply this function to our QPSK signal and create 4 strips total (recall that the strip containing the frequency incoherence is discarded) with a return of 3 strips. In practice, this would not be applied to a noised signal but we will do that here simply to avoid the pitfalls that can accompany plotting perfect simulated data.

```
nstrips=4
alpha=0.25
strips=create_strips(sn, nstrips, alpha)
```

Figure 6:
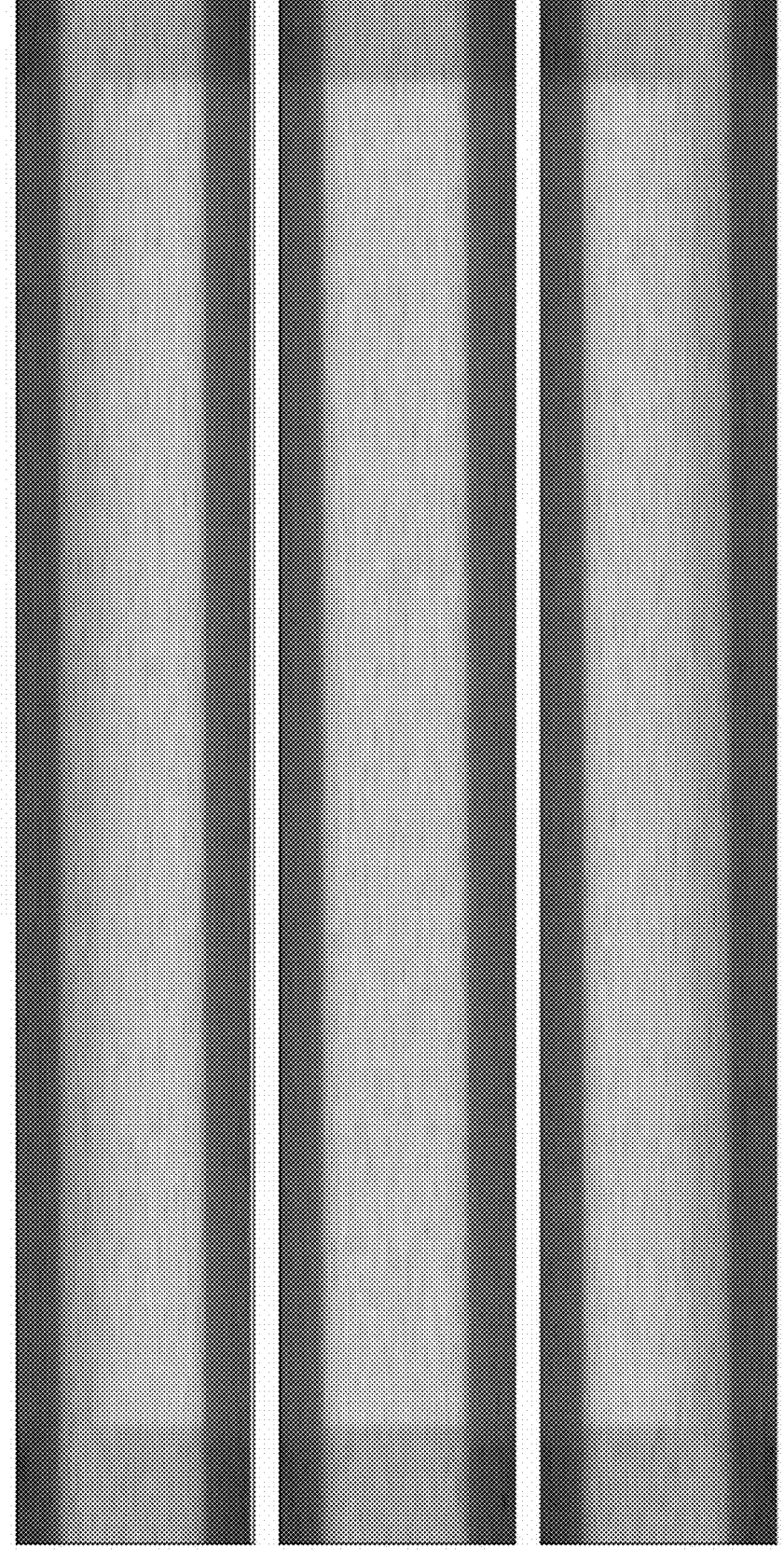
FIG. 6 depicts spectrograms for each of three strips.

The previous code block sets the number of strips and channelization filter roll-off and then uses these both, along with the simulated QPSK as the input to our dual channelization function, create_strips. For what follows, we've chosen to use 3 strips total (3 strips plus 1 strip that is removed) but any even number of strips can be used in the above defined function. The plot in FIG. 6 shows the spectrograms for each of the strips.

```
plt.close("all")
plt.figure(tight_layout=True, figsize=(8*pltscl, 4*pltscl))
for i in range(strips.shape[0]):
    ax=plt.subplot(strips.shape[0], 1, strips.shape[0]-i)
    ax.specgram(strips[i,:], Fs=1)
ax.set(xticks=[ ], yticks=[ ])
```

The previous code displays the different strips in their correct order, showing the underlying signal separated into multiple pieces.

In order to coherently recombine these strips, we need to properly align them in time amplitude, frequency and phase.

Since they came out of the same channelizer, time and amplitude alignments aren't necessary. If we were receiving these strips via a transmission, we would need to perform those alignments. In order to align them in frequency and phase, we need to shift them, so they are in the same relative frequency positions as they were in the original signal. This means that we must upsample the strips in order to give the strips the required bandwidth they need to shift them far enough. Once this upsampling and tuning is complete, we can then calculate a relative phase offset for each of the sets of adjacent strips and rotate them each accordingly.

For our example, we'll upsample the strips by a factor of 4 since we extracted 4 strips total from the original signal. We could get away with 3 but we want to compare it to our original to make sure we can get the same symbols out, so we'll keep it at 4.

```
stripsr=ss.resample(strips,         strips.shape[1]*nstrips,
    axis=1)
```

The previous code uses a simple Fourier domain based resampler.

We now need to tune each signal based on the relative position of where that strip goes.

The following code will perform this relative tuning.

```
stripsrt=np.empty_like(stripsr)
for i in range(strips.shape[0]):
    stripsrt[i,:]=stripsr      [i,:]    *np.exp(-1J*2*np.pi*
        (strips.shape[0]//2-i)/(2*nstrips)*np.arange(stripsr.
        shape[1]))
```

The previous code takes each upsampled strip and multiplies it by a complex sinusoid in order to tune that strip to its correct frequency relative to the other strips.

Figure 7:
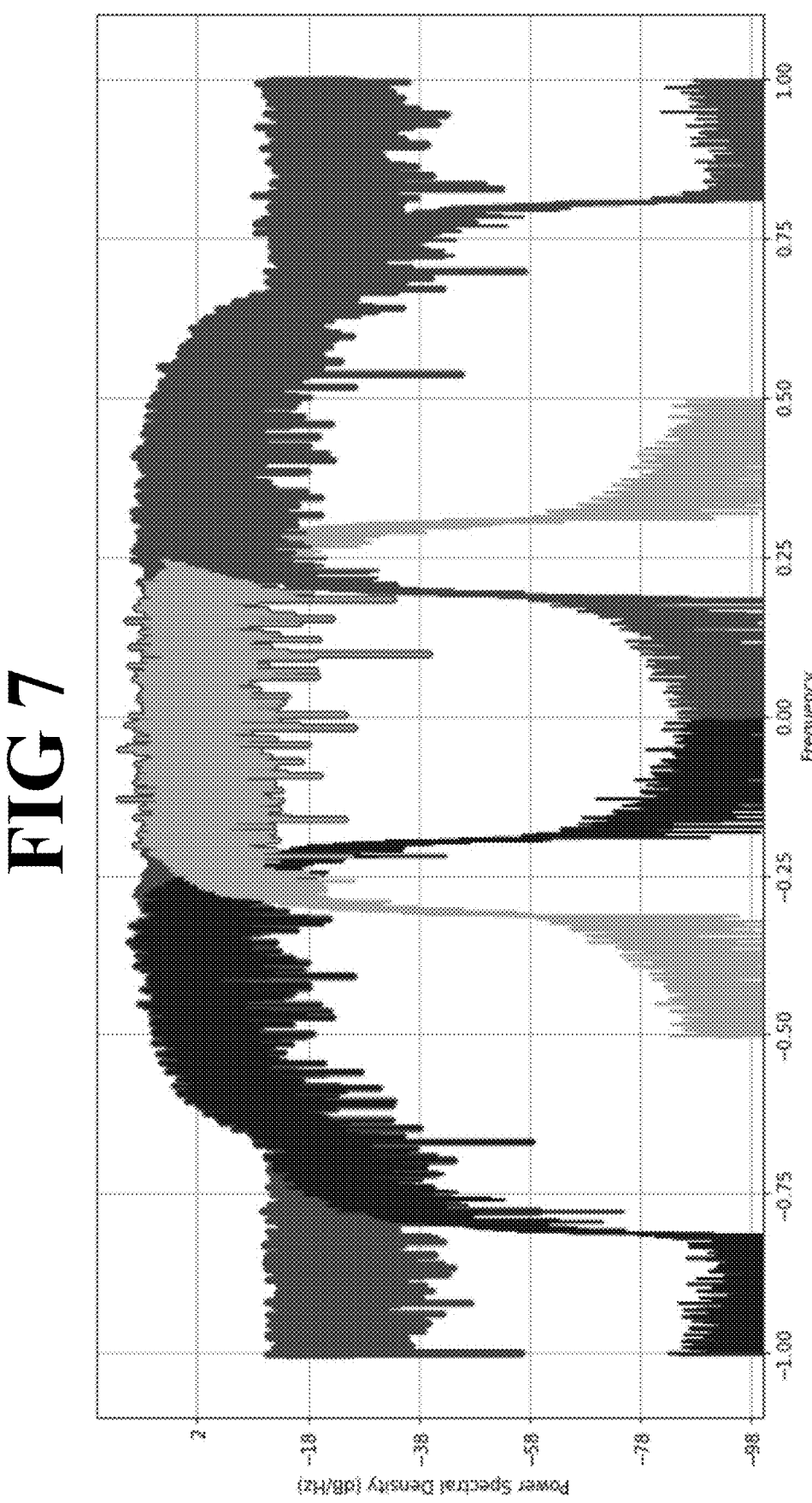
FIG. 7 depicts the power spectrums for each of the strips along with the original signal itself.

The plot in FIG. 7 shows the power spectrums for each of the strips along with the original signal itself. Exploring this plot by zooming in on the spots that overlap shows us that we have indeed done a proper frequency alignment between the relative strips. It should be noted that with the aforementioned technique there is an inherent inefficiency since each strip is oversampled to twice the rate required to capture the original signal. This is a result of the strips' sample rates which accommodate the excess bandwidth of the PFBC filter in each strip. This is mentioned because in FIG. 8, each strip is decimated by 2, removing that extra bandwidth.

```
plt.close("all")
plt.figure(tight_layout=True, figsize=(8*pltscl, 4*pltscl))
nfft=2**14
plt.psd(sn*nstrips, NFFT=nfft, linewidth=4, color="r")
cmap=mpl.cm.get_cmap("hsv")
colors=cmap(np.linspace(0.1, 0.9, stripsrt.shape[0]+1))
for i in range(stripsrt.shape[0]):
    plt.psd(stripsrt[i,::2], NFFT=nfft, color=colors[i])
plt.gca( ).set(ylim=[-100, 20]);
```

Figure 8:
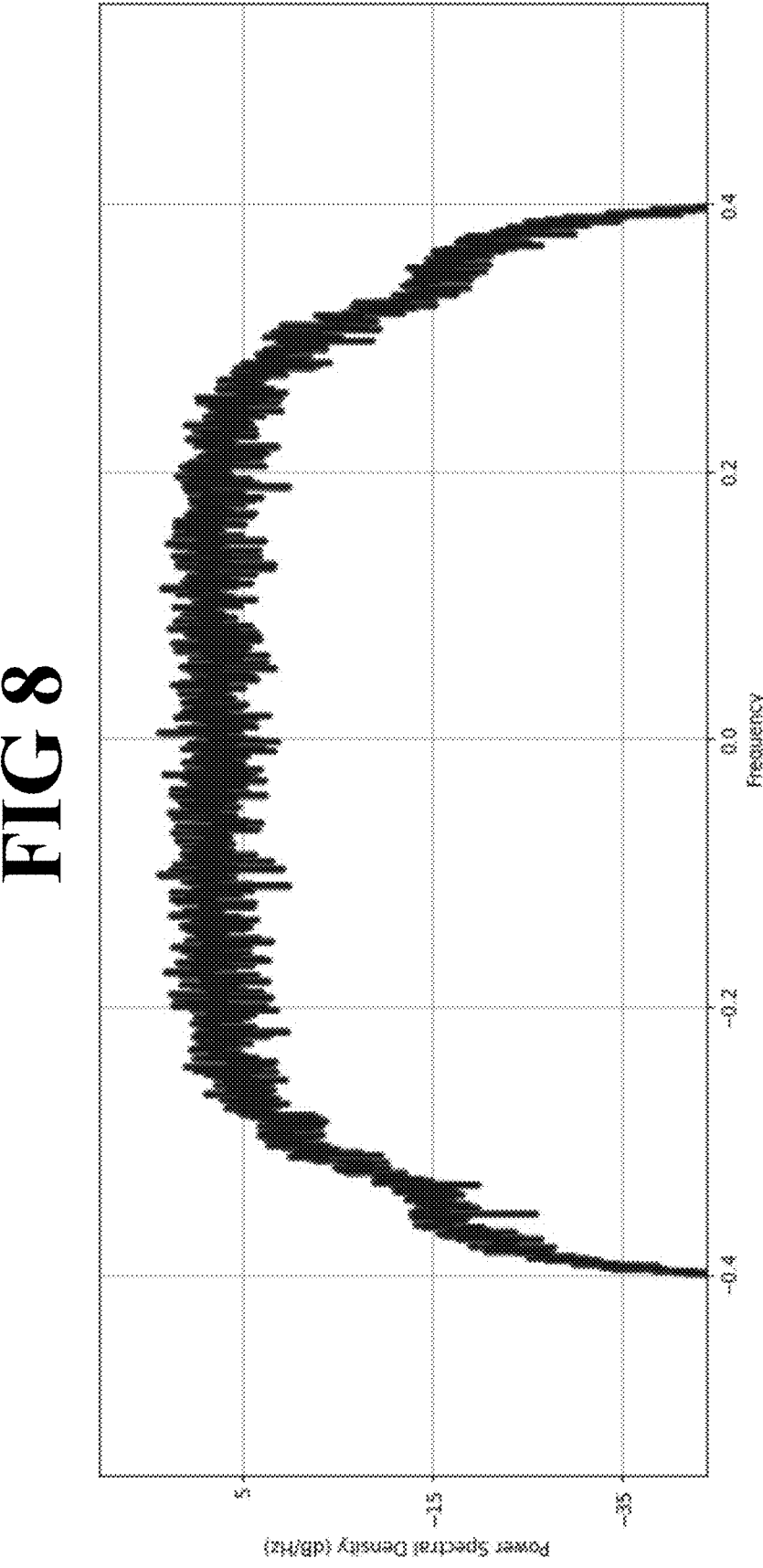
FIGS. 8-9 depicts a result of combining three strips back into the original signal according to one aspect of the present invention.

The previous code plots all of the strips along with master signal shown in FIG. 8. This is done to show that the relative frequencies and amplitudes are properly aligned.

The last calculation left to do is to align the strips in phase now that the time, amplitude and frequency alignments have been performed. This is done via a simple correlation between adjacent sets of strips. The following code performs this phase alignment.

```
Phase_adj=np.zeros(stripsrt.shape[0], dtype="float")
for I in range(stripsrt.shape[0]-1):
    phase_adj[i+1]=np.angle(np.sum(stripsrt[i,:]
    stripsrt[i+1,:].conj( )))
stripsrtpa=stripsrt*np.exp(1J*np.cumsum(phase_adj)).re-
    shape(-1,1)*np.exp(1J*np.pi/2)
```

The previous code correlates one strip with the next adjacent strip in order to determine their relative phase offset. That offset phase angle is then multiplied by the strip in order to rotate it into the correct phase alignment.

With the strips now aligned in all the necessary ways, we can sum them together and compare that to the original signal again noting that the recombined signal will be oversampled by 2. We will additionally apply a single raised cosine filter to the original noised signal with that filtering being equivalent to the sum of the 3 individual filters used for the 3 strips. This is done so that we can compare the equivalence of the original signal with the reconstructed one.

```
strips_sum=np.sum(stripsrtpa, axis=0)
corr_val=np.vdot(strips_sum[1::2], sn)
strips_sum*=np.exp(1J*np.angle(corr_val))
filt_sn=cp.rcosfilter(nstrips//2*100, alpha/(nstrips-1),
    nstrips/(nstrips-1), 1) [1]
snf=ss.convolve(sn*(nstrips-1), filt_sn, ""sam"")
nfft=2**12
plt.close ""al"")
plt.figure(tight_layout=True, figsize=(8*pltscl, 7*pltscl))
ax0=plt.subplot(2,2, (1,2))
ax0.psd(snf, color "" "", sides ""twoside"", NFFT=nfft,
    linewidth=4, Fs=1)
ax0.psd(strips_sum[::2], color "" "", sides ""twoside"",
    NFFT=nfft, Fs=1)
ax0.set(ylim=[-44, 20])
ax1=plt.subplot(2,2,3)
ax1.plot(snf[:10000].real, snf[:10000].imag, "r", marker-
    size=4)
ax1.plot(strips_sum[:20000:2].real, strips_sum[:20000:
    2].imag, "b",
markersize=1)
ax1.set(title ""I/Q Plo"")
ax2=plt.subplot(2,2,4)
ax2.plot(np.abs(snf-strips_sum[::2]) [2000:-2000], color
    ""purpl"")
ax2.set(xticks=[ ], title ""Amplitude of Differenc"");
```

The previous code performs a global phase adjustment that arises as a result of the resampling and tuning process then applies the single raised cosine filter to the original signal which is equivalent to the sum of the 3 channelizing filters. The original signal and the summed channels are then plotted in frequency as well as in the complex time domain. The magnitude of the difference of the summed signal and the original signal is also plotted, this being shown in FIG. 9.

Figure 9:
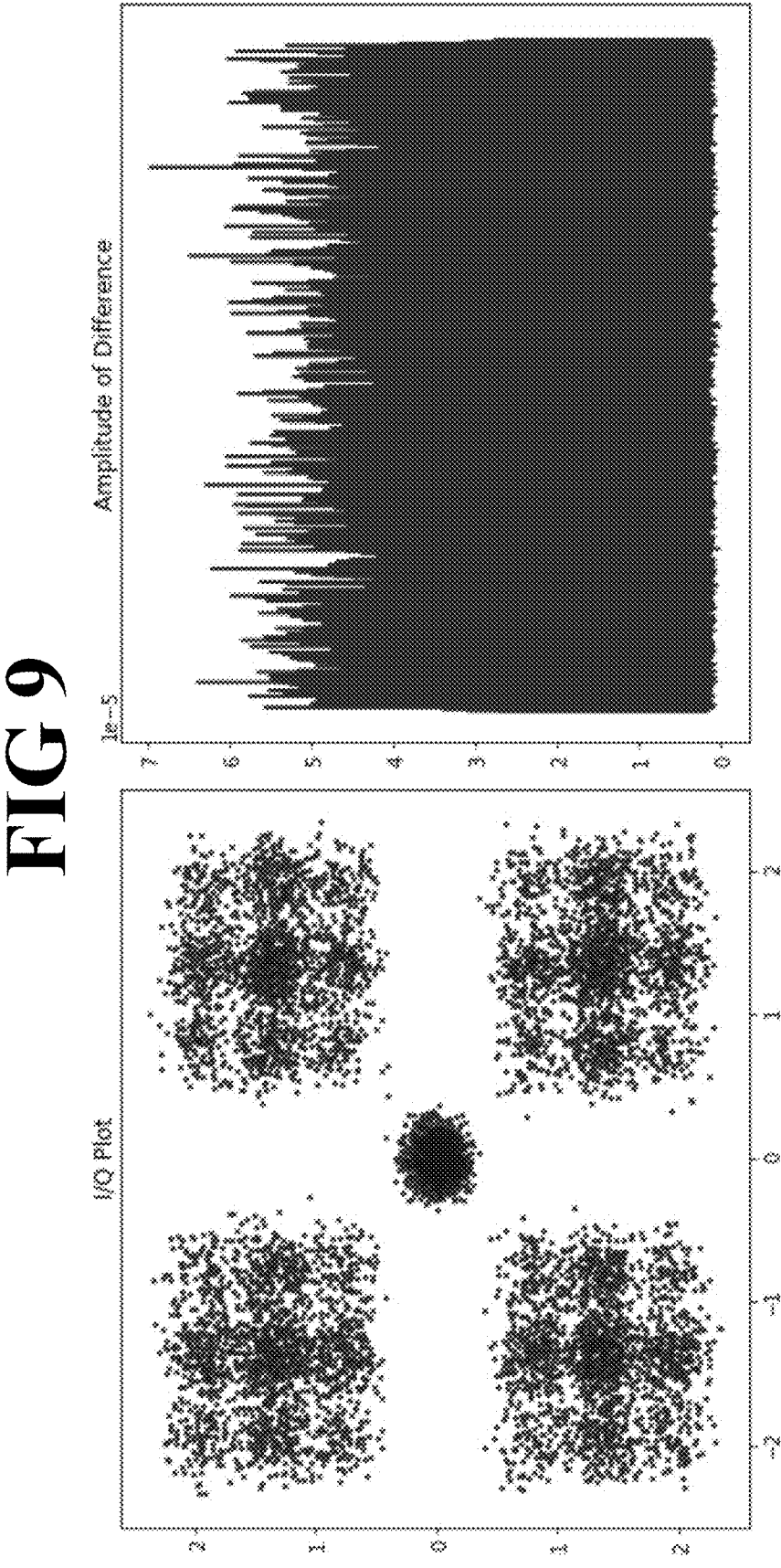

The plots in FIG. 8 and FIG. 9 show that we were able to combine the 3 strips back into the original signal.

Joint Equalization Alignment

In a real world scenario, proper alignments can be difficult because of time varying channels, equipment instabilities and other factors. In practice, when we receive multiple strips, we can roughly align them then use an equalizer to recombine the individual strips. Conceptually, an equalizer finds a linear combination of input samples that minimizes that linear combination's distance from some desired value with the linear combination's weights being subject to specific constraints. Typically, a single signal is fed to an equalizer, but this is not a requirement, and we can in fact feed multiple signals to an equalizer as long as we maintain the same relative positions (in time and frequency) for each of the input samples coming from different signals.

We will demonstrate this concept by creating strips from a QPSK signal and then simulate separate instabilities for each strip. We will use a Leaky-Normalized LMS Equalizer to perform the alignment and recombination of the strips.

```
#Simulate QPSK signal
syms=constl[np.random.randint(4, size=(100000,))]
spb=2
psf=cp.rrcosfilter(spb*25+1, 0.35, spb, 1) [1]/spb
pt=np.kron(syms, np.r_[1, np.zeros(spb-1)])
s1=ss.convolve(pt, psf, "same")
#Create the strips of the signal
nstrips=8
alpha=0.25
strips=create_strips(s1, nstrips, alpha)
```

The previous code creates a QPSK signal and then uses the channelizing code to strip it into 7 strips (8 minus the 1 strip with frequency incoherencies).

Before adding noise, timing and amplitude variations and frequency/phase instabilities, we will up-sample each strip to its approximate eventual sample rate.

```
samp_fctr=10
phsvar_fctr=0.5
ampvar_fctr=0.1
strips_r=[ ]
for i in range(strips.shape[0]):
    nsamps=strips.shape[1]*nstrips+int(np.round((np.ran-
        dom.rand(1)-0.5)*samp_fctr))
    strips_r.append(ss.resample(strips[i,:], nsamps))
    strips_r[i]=strips_r[i]*np.exp(-1J*2*np.pi*
        (strips.shape[0]//2-i)/(2*nstrips)*np.arange(strips_r
        [i].shape[0]))
    phsvar=ss.resample(np.random.randn(20),   nsamps)*
        phsvar_fctr
    ampvar=ss.resample(np.random.randn(10),   nsamps)*
        ampvar_fctr+1
    strips_r[i]=cp.awgn(strips_r[i]*np.exp(1J*phsvar)*
        ampvar,
    5)*np.exp(1J*np.random.rand(1)*2*np.pi)
```

The previous code up-samples each strip to a random number of samples approximately the same length, simulating instabilities in different transmitters. It randomly applies an amplitude variation and phase variation as well.

Figure 10:
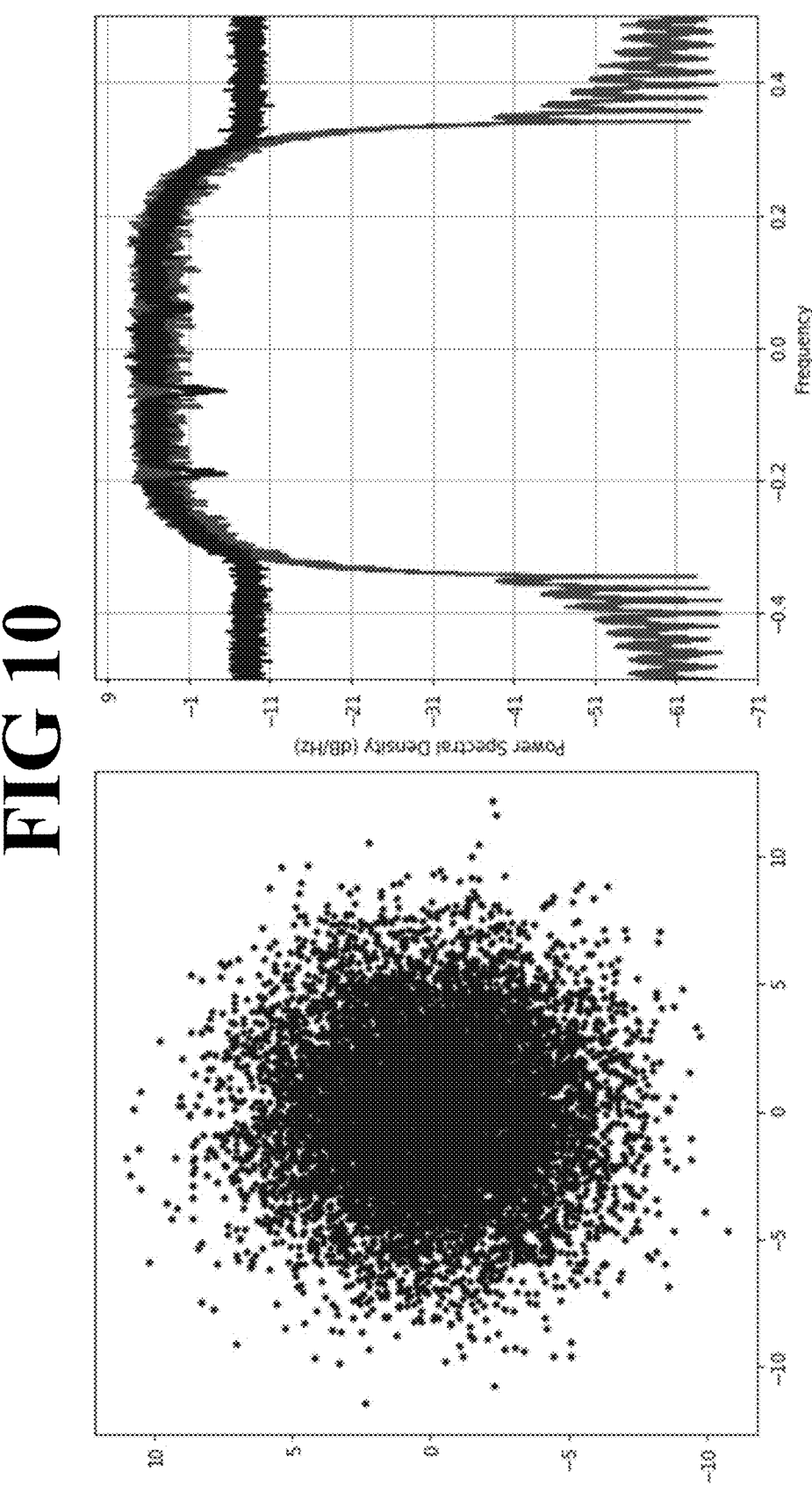
FIG. 10 depicts a result of combining three strips after up-sampling back into the original signal according to another aspect of the present invention.

Given all of these instabilities, if we sum the strips at this point, even with a reasonable set of frequency alignments, we get the plot in FIG. 10. The original noiseless signal is shown in red.

```
sig_sum=np.zeros(np.min([x.shape[0] for x in strips_r]),
    dtype="complex")
for strip in strips_r:
    sig_sum+=strip[:len(sig_sum)]
plt.close("all")
plt.figure(tight_layout=True, figsize=(8*pltscl, 4*pltscl))
plt.subplot(1,2,1)
dp.plotc(sig_sum[:10000], 'b.')
ax=plt.subplot(1,2,2)
ax.psd(s1/np.mean(np.abs(s1)), color="r", NFFT=2**14,
    Fs=1)
ax.set(yticks=[ ], xlim=[−0.5, 0.5])
ax.psd(sig_sum/np.mean(np.abs(sig_sum)),
    NFFT=2**14, Fs=2, color="b");
```

The previous code simply sums the individual strips without regard for any alignments. We can see the differences in the summed PSD vs the original signal's PSD.

We now combine these strips using an LN-LMS equalizer rather than simply summing them.

```
def ln_lms_eq(s, constl, sps, ntaps, mu, alpha,
    inittap=np.ones(1)):
    w=np.zeros(ntaps, dtype="complex")
    w[ntaps//2−len(inittap)//2:ntaps//2−len(inittap)//2+len
        (inittap)]=inittap
    s_pad=np.pad(s.flatten( ), ntaps//2)
    y=np.zeros((len(s_pad)−ntaps+1)//sps,
        dtype="complex")
    e=np.zeros((len(s_pad)−ntaps+1)//sps,
        dtype="complex")
    for idx in np.arange (len(y)):
        x=s_pad[idx*sps:idx*sps+ntaps]
        y[idx]=np.vdot(w, x)
        midx=np.argmin(np.abs(constl−y[idx]))
        e[idx]=constl[midx]−y[idx]
        w=(1−alpha)*w+mu/np.real(np.vdot(x, x))*np.conj
            (e[idx])
    return y, e, w
#Interleave the samples
min_len=np.min([len(x) for x in strips_r])
strips_ri_mtx=np.empty((min_len, len(strips_r)),
    dtype="complex")
for i, strip in enumerate(strips_r):
    strips_ri_mtx[:, i]=strip[:min_len]
strips_ri=strips_ri_mtx.reshape(1,−1).flatten( )
#Equalize the interleaved samples
sps=len(strips_r)*spb*2
ntaps_bauds=30
inittaps=np.blackman(sps*ntaps_bauds)*0.005+
np.random.randn(sps*ntaps_bauds)*0.001
y, e, w=ln_lms_eq(strips_ri/np.mean(np.abs(strips_ri)),
    np.exp(1J*2*np.pi*np.arange(1, 8, 2)/8),
    sps,
    sps*ntaps_bauds,
    0.2,
    0.0005,
    inittap=inittaps)
```

The previous code defines a Leaky-Normalized Least Means Squared (LN-LMS) equalizing function and applies that to the interleaved samples of the individual strips. This is a fractionally spaced equalizer that steps an entire symbol at a time. The output is the equalized set of QPSK symbols.

Figure 11:
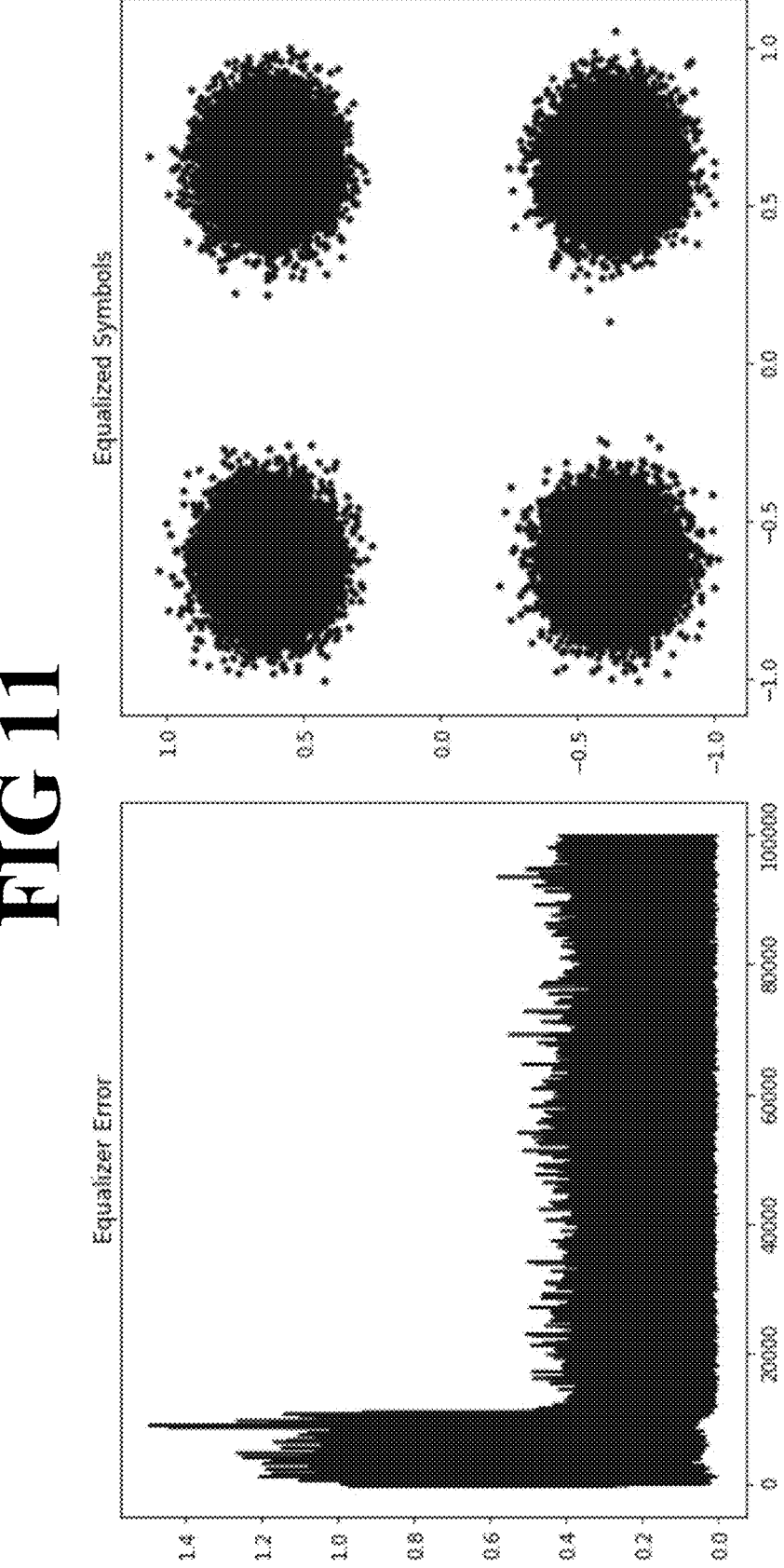
FIGS. 11-12 depict a result of using an LN-LMS equalizer rather than simply summing the strips according to yet another aspect of the present invention.
Figure 12:
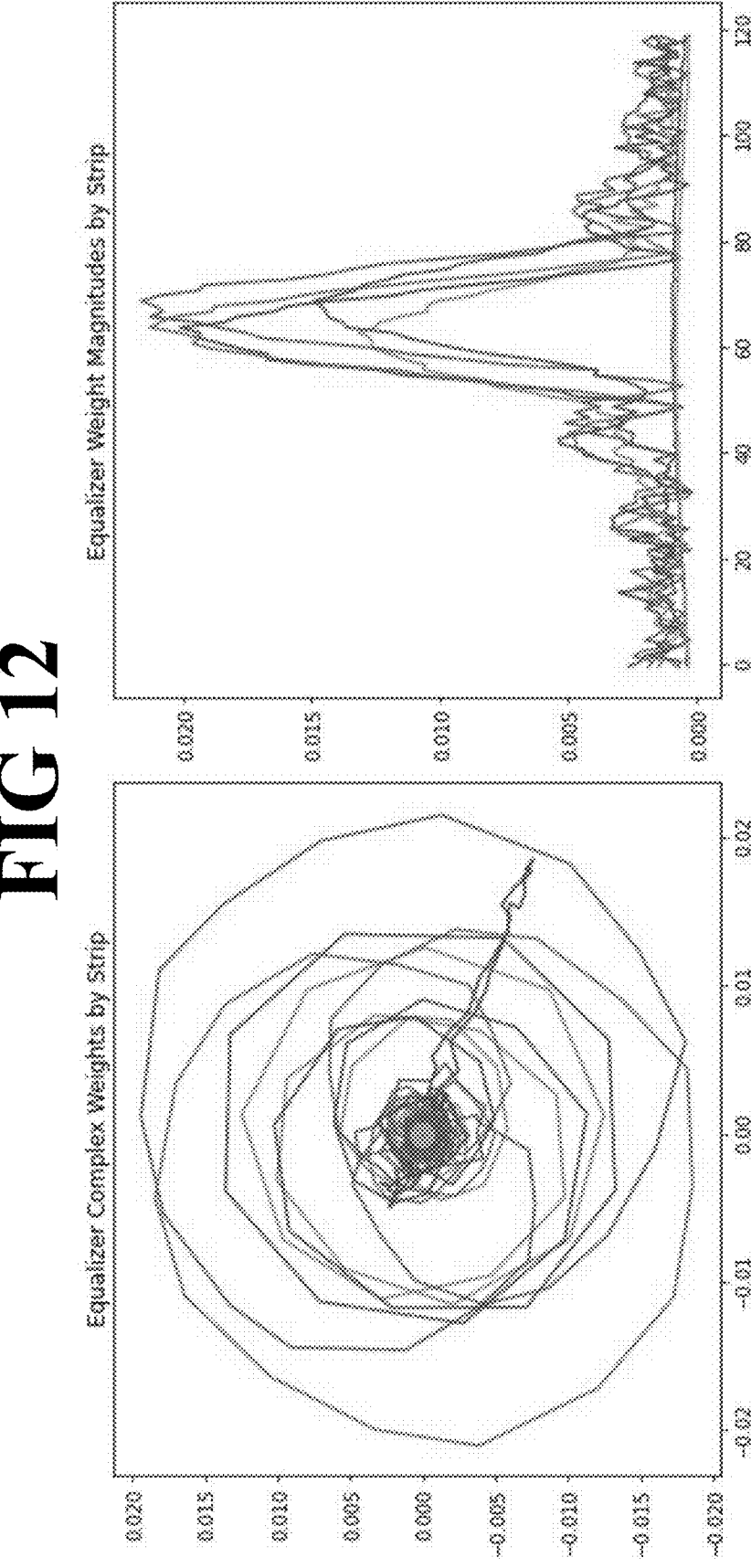

The plots in FIG. 11 and FIG. 12 show how well this performed.

```
plt.close("all")
plt.figure(tight_layout=True, figsize=(8*pltscl, 7*pltscl))
ax1=plt.subplot(2,2,1)
ax1.plot(np.abs(e), color="b")
ax1.set(title="Equalizer Error")
ax2=plt.subplot(2,2,2)
ax2.plot(y[20000:].real, y [20000:].imag, '.', color="b")
ax2.set(title="Equalized Symbols")
ax3=plt.subplot(2,2,4)
ax3.plot(np.abs(w).reshape(−1, nstrips−1))
ax3.set(title="Equalizer Weight Magnitudes by Strip")
ax4=plt.subplot(2,2,3)
ax4.plot(w.reshape(−1, nstrips−1).real, w.reshape(−1,
    nstrips−1).imag)
ax4.set(title="Equalizer Complex Weights by Strip");
```

The previous code plots the Equalizer Error where the initial training of the equalizer weights is clearly visible, the equalized symbols after the error signal has settled down, the individual sets of equalizer taps in complex plot as well as magnitude.

In this case, we can see the point at which the equalizer error settles down and for illustration purposes we plot the output symbols only after this point. We can see that after this point, the equalized symbols can easily be interpreted with minimal errors. It should be mentioned that there are many techniques to decrease the initial error or re-equalize those symbols but none of those techniques are employed here.

Time and Frequency Division and Dispersion

Given that properly aligned raised cosines can be combined to create a single raised cosine, as has now been demonstrated in the frequency domain, we can apply this concept in the time domain in order to create several pieces of the original signal's strips. The time domain is broken up by creating overlapping amplitude masks and applying those masks to each strip. Through proper alignment, those individual pieces can be recombined to recreate the original signal.

The frequency division and time division concepts can now be combined in order to break up the signal in both time and frequency into small blocks that can be reconstructed upon reception. Intuitively speaking, think of taking the spectrogram of a signal and gridding it up in time and frequency, extracting each individual grid cell and transmitting those pieces at different times and frequencies. By knowing which pieces go where in the overall grid, we can recombine them all to recreate the original signal that was gridded before transmission.

Given what we have developed to this point, many variations are now evident. Some of these include:

Tolerance levels could be provided for misalignments or erasures that still allow for proper signal reconstruction. It can be shown that partial reconstruction can be sufficient to recover the information that was sent. For example, the underlying signal can be reconstructed even while missing some number of strips.

The technique could be integrated with cryptographically sound scrambling to send grid cells in an obfuscated order. With this technique, depending on the number of strips and timing grid segments, an extraordinarily high number of possibilities for reassembly can be achieved. For example, if in a single burst there are 10 time slots and 5 strips, a total of 50!=3.04E+64 different grid realignments are possible.

The technique could be employed to create scrambled continuous wave carriers. By gridding in time and frequency then scrambling and putting back together in close proximity, it's possible to make the new signal look like a continuous wave signal.

Optimal gridding strategies, modulation choice and parameter selection can be developed for minimizing cyclostationary parameter detection and signal obfuscation.

Further signal obfuscation via spreading with a constant amplitude signal can be employed on each individual strip or on the underlying signal.

Cross-correlation can be decreased or eliminated by decreasing the PFBC's filter's excess bandwidth with a limiting case of $\alpha=0$. Given that it is possible to remove some of the strips and still extract the original signal, different techniques for channelization can be used, particularly techniques that do not overlap in frequency like the channelization presented here.

Figure 13:
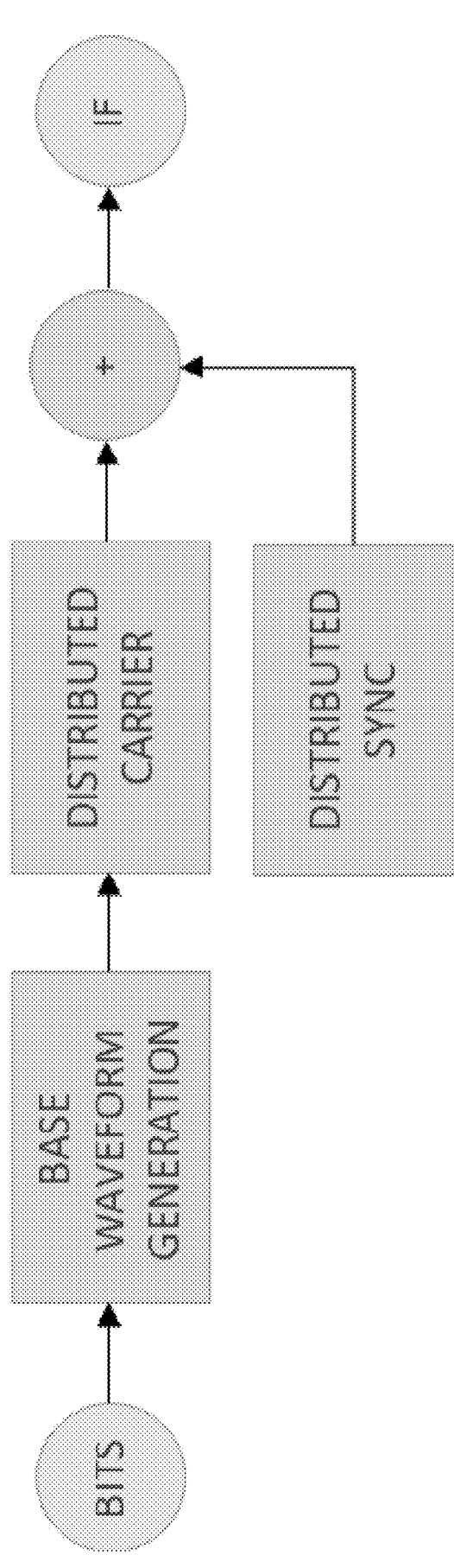
FIG. 13 depicts an exemplary embodiment of a waveform generation process according to one aspect of the present invention.
Figure 14:
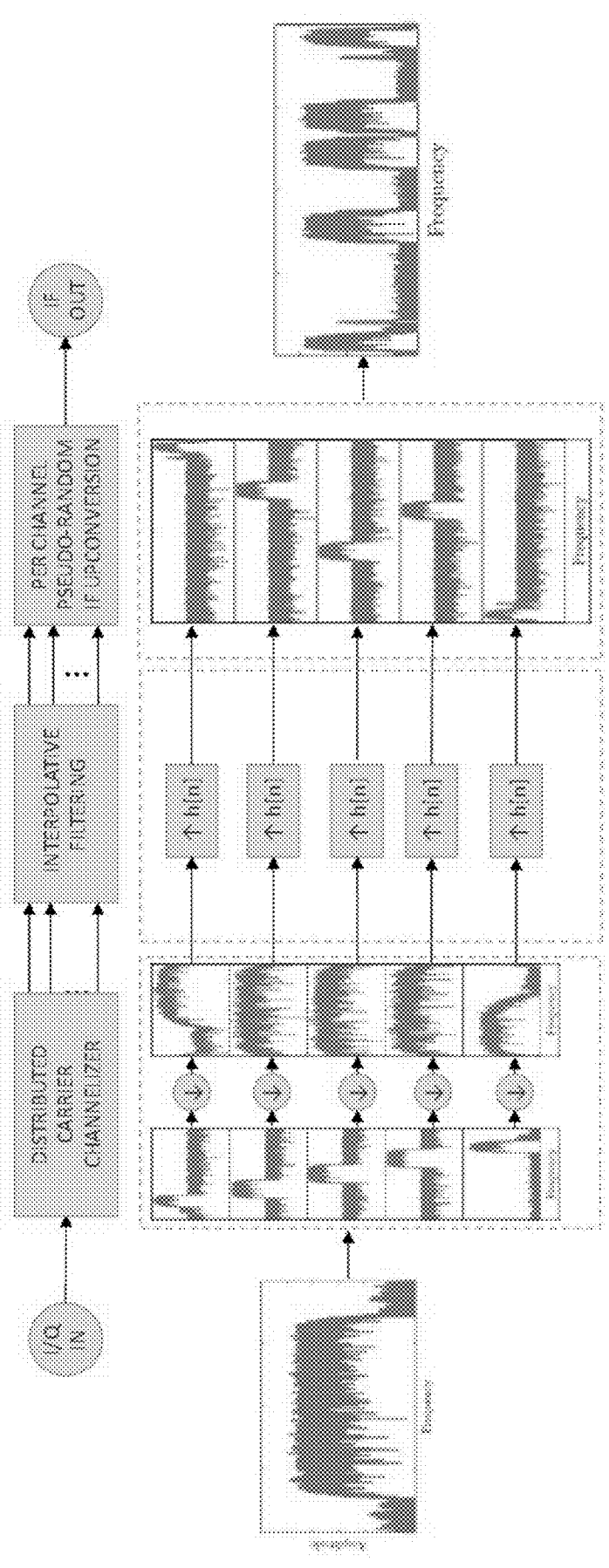
FIG. 14 depicts an exemplary embodiment of a distributed carrier process according to another aspect of the present invention.

Turning to FIG. 13, an exemplary LPI/LPD waveform comprises two distinct modulation stages for data generation, plus another stage which is used for acquisition and synchronization. For the information transport bursts, the "base waveform" stage and the "Distributed Carrier" stage are used. At predictable intervals, the "Distributed Sync" (DS) burst is added. The overall waveform generation process is illustrated in FIG. 13. The transmitter expects a bitstream of raw bits which then generates a base waveform burst, followed by the Distributed Carrier stage (described herein) which modulates the waveform to a wideband IF. The Distributed Carrier process depicted in FIG. 14 is an independent process that can take the single-carrier base waveform, split it up in frequency, and then redistributes the subcarriers in a pseudo random order and channel assignment. The "Distributed Sync" process is described in U.S. Provisional Patent Application No. 63/324,181, which has been previously incorporated by reference in its entirety.

The frequency stripping process can be accomplished by using multiple matched polyphase filter bank channelizers on the single-carrier base waveform. FIG. 15 shows a frequency domain representation of the stripping process. FIG. 15 shows the channelizer illustration with N=5 strips.

The fundamental premise of the Distributed Carrier (DC) concept is to channelize a single high data rate waveform in such a way that each individual channel has a bandwidth well below the Nyquist rate for the information carried by the base waveform, making full data extraction from the individual channels a theoretic impossibility. Thus, the individual channels do not carry enough information from the base waveform to be useful and only in the aggregate can the entire base waveform be reconstructed by the receiver. After generation, the individual channels are up-converted onto pseudo-randomly chosen carrier frequencies within the bandwidth of the high rate hardware IF in such a way as to obfuscate the order in which they occur in the base waveform.

A simple but albeit contrived example will help demonstrate the security offered by fragmenting a signal in frequency by showing that two very different signals may have a common subset of channels. We begin with a standard QPSK created using a Root-Raised Cosine pulse shaping filter with a 25% excess bandwidth. Apply the simplest possible channelization—two channels—as shown in FIGS. 16-18. We can see the channelization (FIG. 18) along with the original pulse shaped QPSK symbols (FIG. 16) and PSD (FIG. 17). This is a simple demonstration. A second signal is created which exactly matches the first signal in its lower channel. The lower channel is untouched other than negligible edge filtering effects and rounding errors. A comparison of the two signals is shown in FIGS. 19-24 with the lower channels' symbols (FIGS. 19 and 22), upper channels' symbols (FIGS. 20 and 23) and sum of the lower and upper channels' symbols (FIGS. 21 and 24) all being shown with the QPSK signal in the plots in FIGS. 19-21 and the contrived signal in the plots in FIGS. 22-24. Only a subset of the two signals' lower and upper channels is shown to aid in comparison via visual inspection in the plots in FIGS. 19, 22 and FIGS. 20, 23, respectively. For the sums of the lower and upper channels, the full symbol sets are shown in the plots in FIGS. 21 and 24. It can be verified that the lower channels are the same, but the upper channels differ completely and therefore their sums differ as well.

In the contrived signal, every other symbol was precisely controlled in order to produce the symbol pattern shown in the plot of FIG. 24. To clarify what this example illustrates, when a signal is channelized using the DC technique, each individual channel could have come from infinitely many different signals meaning that no single channel contains enough information to extract the base waveform's information. Therefore, to demodulate the base waveform and know that the demodulated symbols are correct, the channels must be received and arranged into their proper relative frequency positions before demodulating the base waveform.

With frequency modulation schemas, whether they employ multiple carriers like OFDM or single carriers like MFSK, the sub-bands contain some independent extractable information that could be recovered by an adversary.

For example, in OFDM, any subset of the subcarriers can be demodulated, and the information extracted, revealing some portion of the signal's payload. This is not the case with PSK and QAM modulation schemas where information is spread across the entire signal's bandwidth in a dependent manner. The use of the Distributed Carrier modulation scheme takes advantage of this property. As explained, each channel is upconverted to a different pseudo-randomly chosen carrier frequency and multiple carriers are employed in each hop time with demodulation requiring individual channels to be realigned in time, amplitude, frequency, and phase. To illustrate the complexity of proper realignment, if 20 channels are used then there are over 2.4 quintillion (2.4E18) combinations of channel arrangements possible. While not the only valid option, the system may employ channelizers which use Raised Cosine (RC) filters to provide reconstruction of the signals. These were chosen because of the property that when properly aligned in time, amplitude, phase and frequency, multiple RC filters sum to make a single filter. FIG. 25 shows this alignment and summation while FIG. 26 shows the PSDs of the full DC burst with its proper channel realignment and reconstruction.

The DC technique enables security through the fundamentals of communications theory. When multiple channels are employed, the bandwidth of each channel is well below the Nyquist rate required to send the information of the base waveform at its rate and the amount of information per channel decreases the more channels are employed. When a secure base waveform is used, the DC technique only adds additional levels of security.

Receiver Design

An exemplary embodiment of a software based receiver is depicted in FIG. 27. The software based receiver depicted in FIG. 27 was simulated using Python and X-Midas. Turning to FIG. 28, shown therein are details of the detector and the distributed carrier recombiner of the present invention. The receiver ingests oversampled pre-demodulated (pred) complex baseband samples. The detector searches for the Distributed Sync waveform in the received signal to establish burst timing. Following the acquisition stage, the receiver filters and retunes each carrier from the Distributed Carrier modulation waveform. The retuned carriers are matched filtered using a custom pulse shape filter. Following the matched filter in FIG. 28, the signal proceeds to equalization and demodulation/decoding.

The receiver exploits properties of the Distributed Sync waveform to perform efficient wideband signal detection in low SWaP hardware. To perform signal detection the ATHERIS receiver generates a matched filter by upsampling the Distributed Sync pattern to the sample rate of the input signal. The input signal then goes through a delay-conjugate-multiply (DCM) operation. The output of the DCM is cross correlated with the matched filter. Peaks in the output of the cross correlation indicate the sample time offset of the start of the Distributed Sync waveform. The detector provides a time of arrival (TOA) and frequency of arrival (FOA) estimate for downstream processing. FIG. 29 is a functional block diagram of the detector.

Using the Distributed Sync for signal detection provides compelling advantages over synchronization sequences (i.e., preambles, acquisition sequences) found in traditional communications systems. The Distributed Sync has unique properties such that the DCM operation on the input signal allows for signal detection with an arbitrarily large carrier frequency offset (CFO). Traditional communication systems require a two-dimensional search in both the time domain and frequency domain to perform signal detection. This two-dimensional signal search is computationally expensive and often the most resource intensive aspect of a receiver. FIG. 30 is a plot from the output of the detector for a waveform with 9 dB received SNR without any knowledge of the signal center frequency.

Once the burst sample timing is established from the detector, the Distributed Carriers are recombined to form a single composite waveform. Each sub-channel of the Distributed Carrier is tuned from an "input IF frequency" to baseband. The signal is low pass filtered, decimated, and then re-tuned to an output IF frequency that corresponds to its original frequency location prior to channelization from the Distributed Carrier modulation process. FIG. 31 is a block diagram of the steps performed on each carrier. The retuned carriers are used as inputs into the joint equalization process which results in a single composite baseband waveform at the symbol rate.

FIG. 32 shows the PSDs for an exemplar waveform fragmented into 7 carriers (top subplot), then re-tuned to its appropriate baseband frequency (middle plot), and then the output composite baseband waveform (bottom subplot) after recombining.

Figure 33:
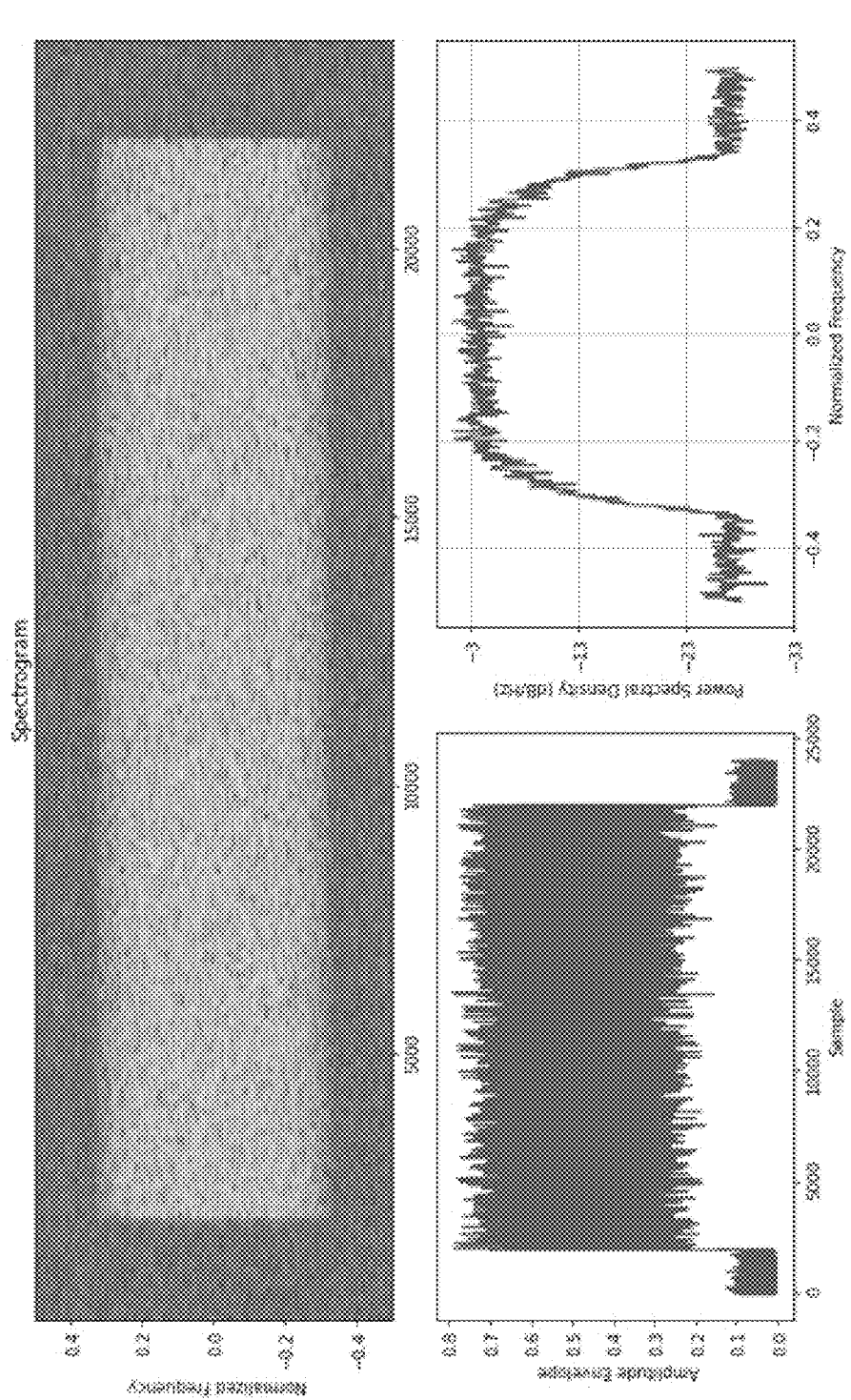
FIGS. 33-36 depict graphically an exemplary embodiment of a method for performing a distributed carrier process according to yet another aspect of the present invention.

Turning to FIG. 33, shown therein is a spectrogram of a base waveform burst, an amplitude envelope versus sample and a power spectral density plot of the same waveform burst. The present invention begins with this waveform burst.

Figure 34:
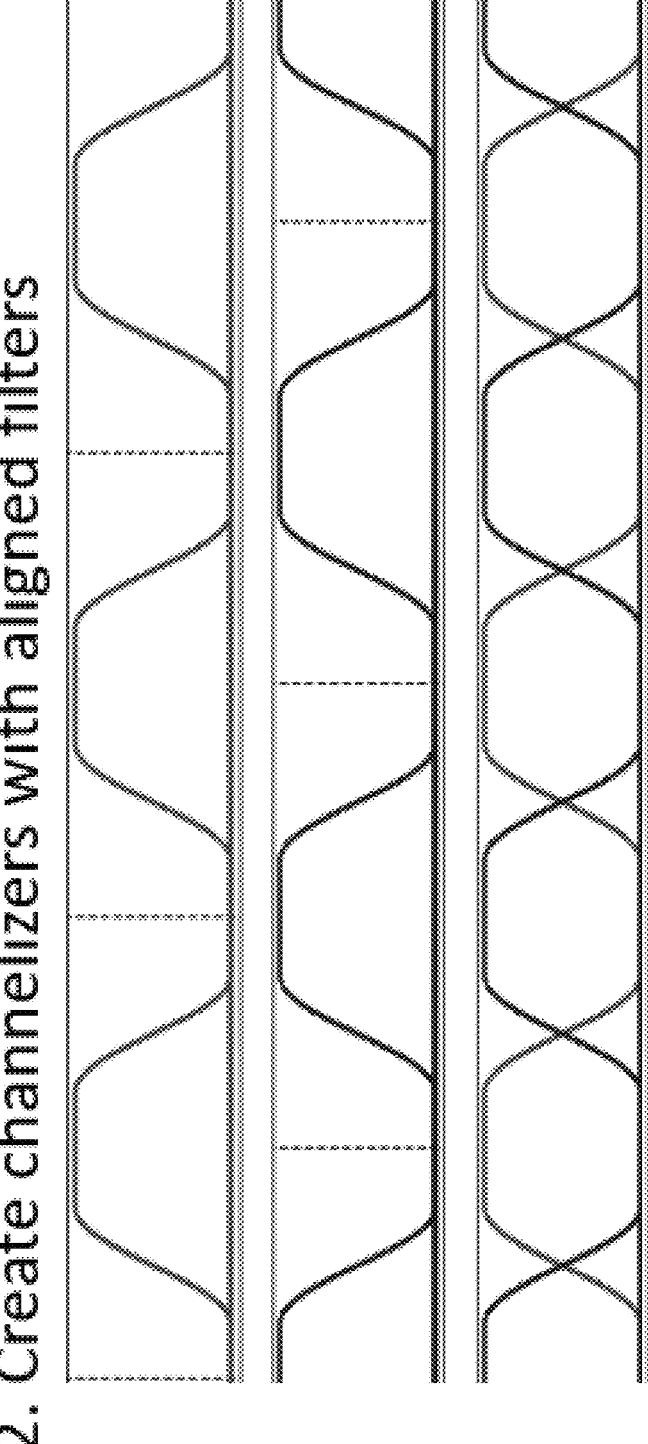
Figure 35:
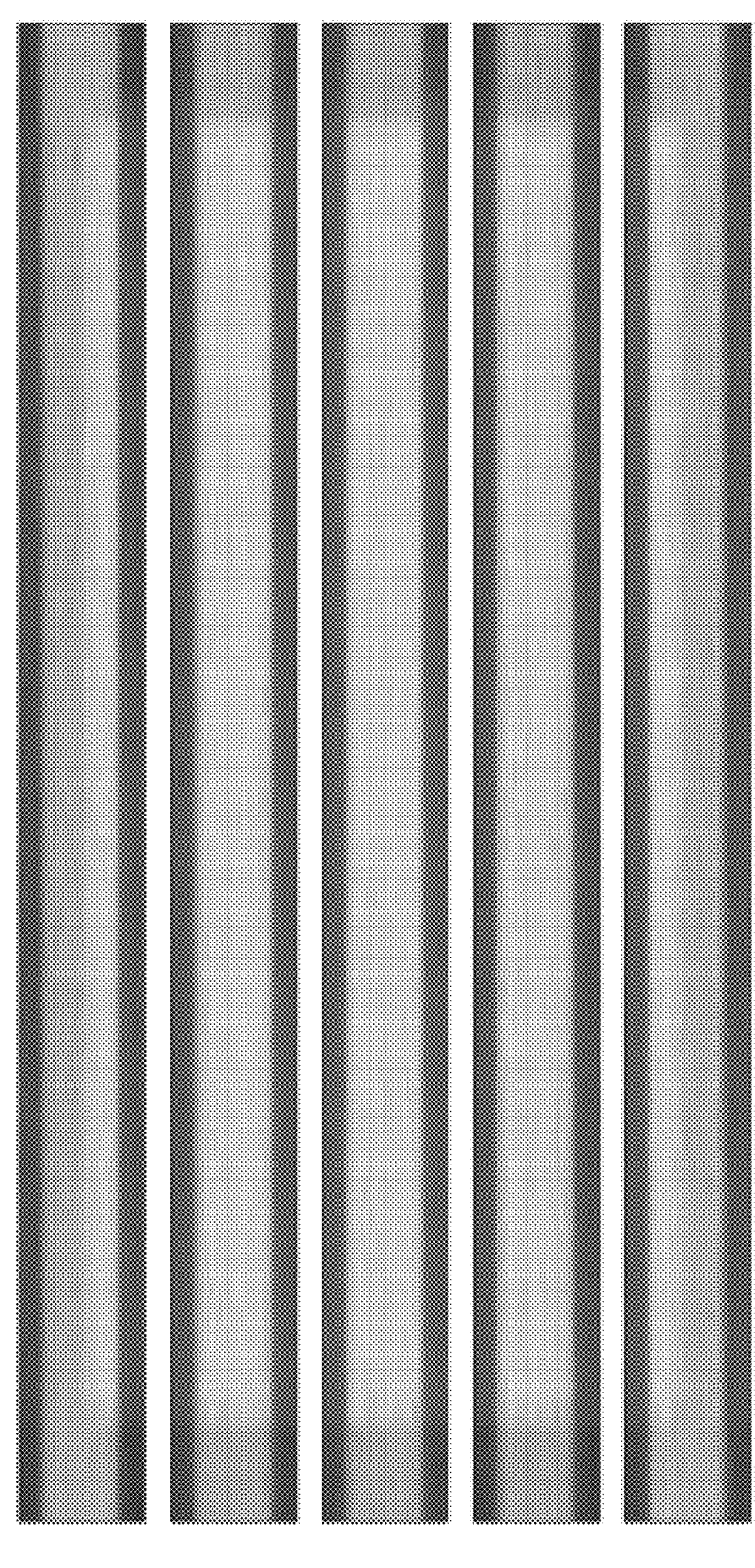
Figure 36:
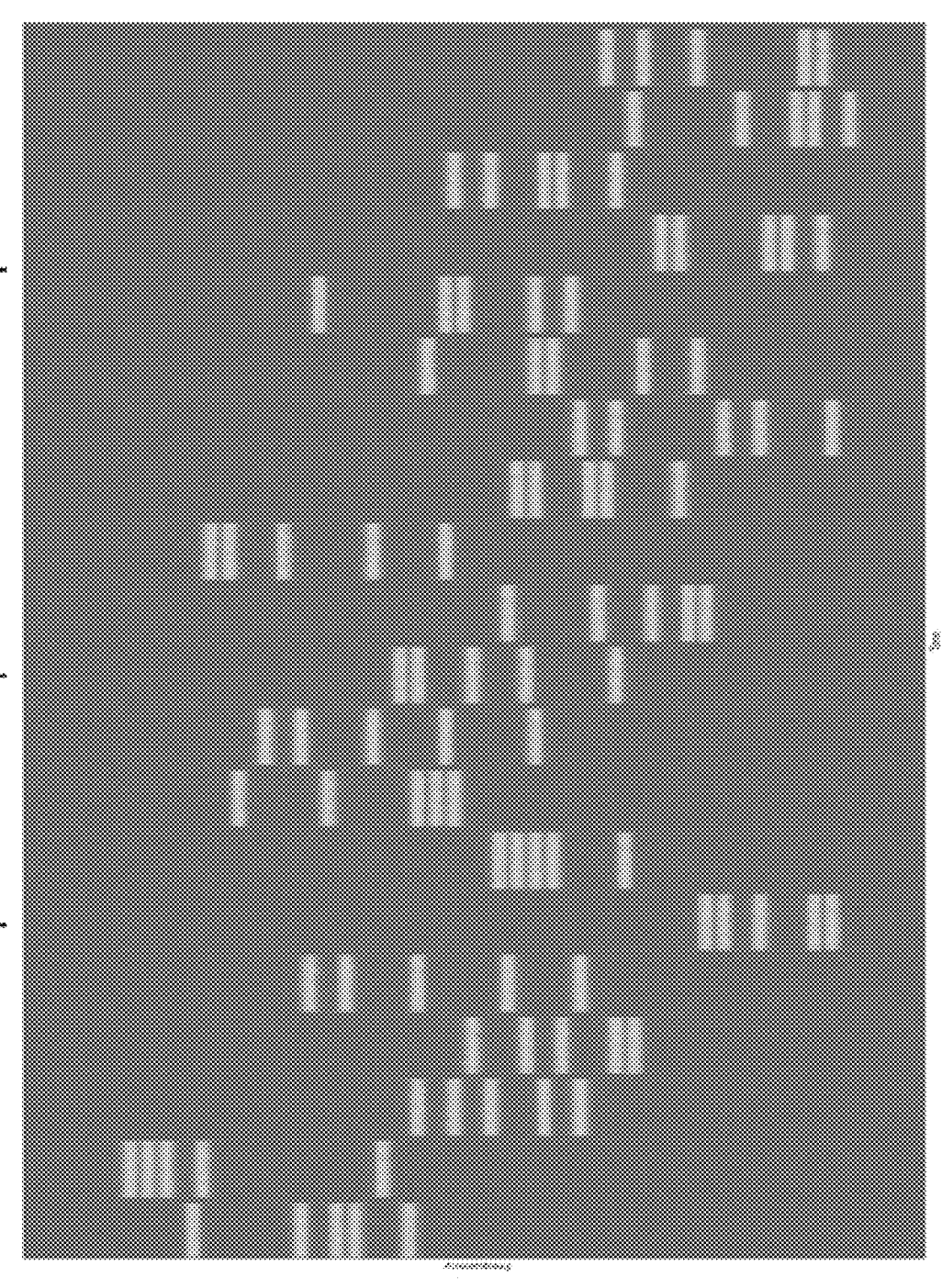

Next, turning to FIG. 34, the process of the present invention for creating a distributed carrier creates channelizers with aligned filters. Then in FIG. 35, the base waveform is channelized using the aligned filters. In FIG. 36, the strips are then distributed over multiple timeslots and frequencies.

Distributed Carrier Reconstruction

Figure 37:
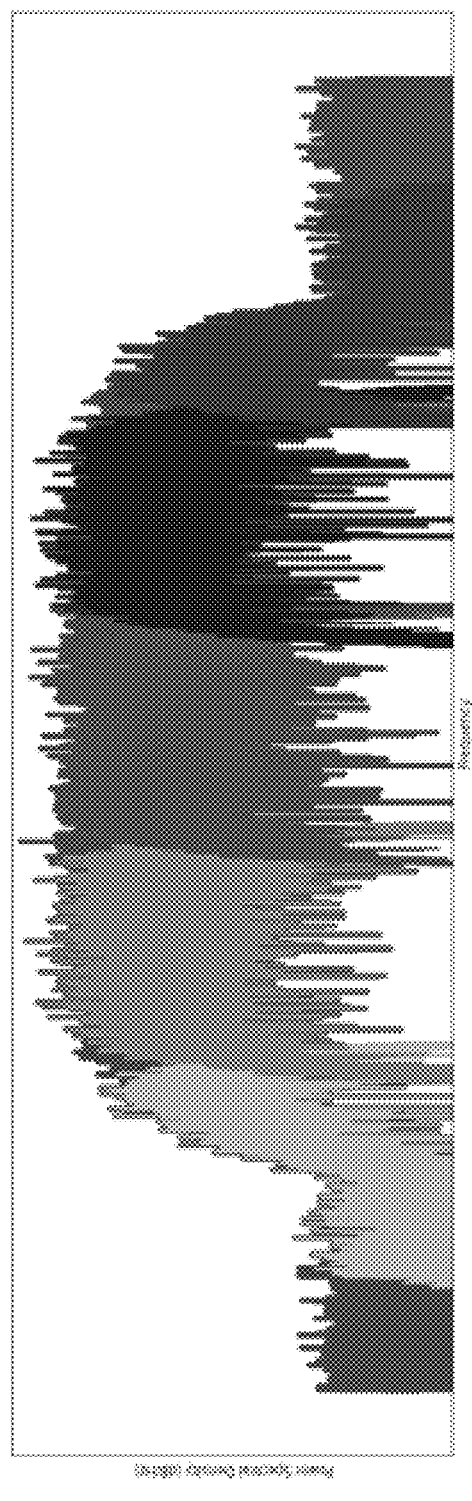
FIGS. 37-38 depict graphically an exemplary embodiment of method for performing a distributed carrier reconstruction process according to still another aspect of the present invention.
Figure 38:
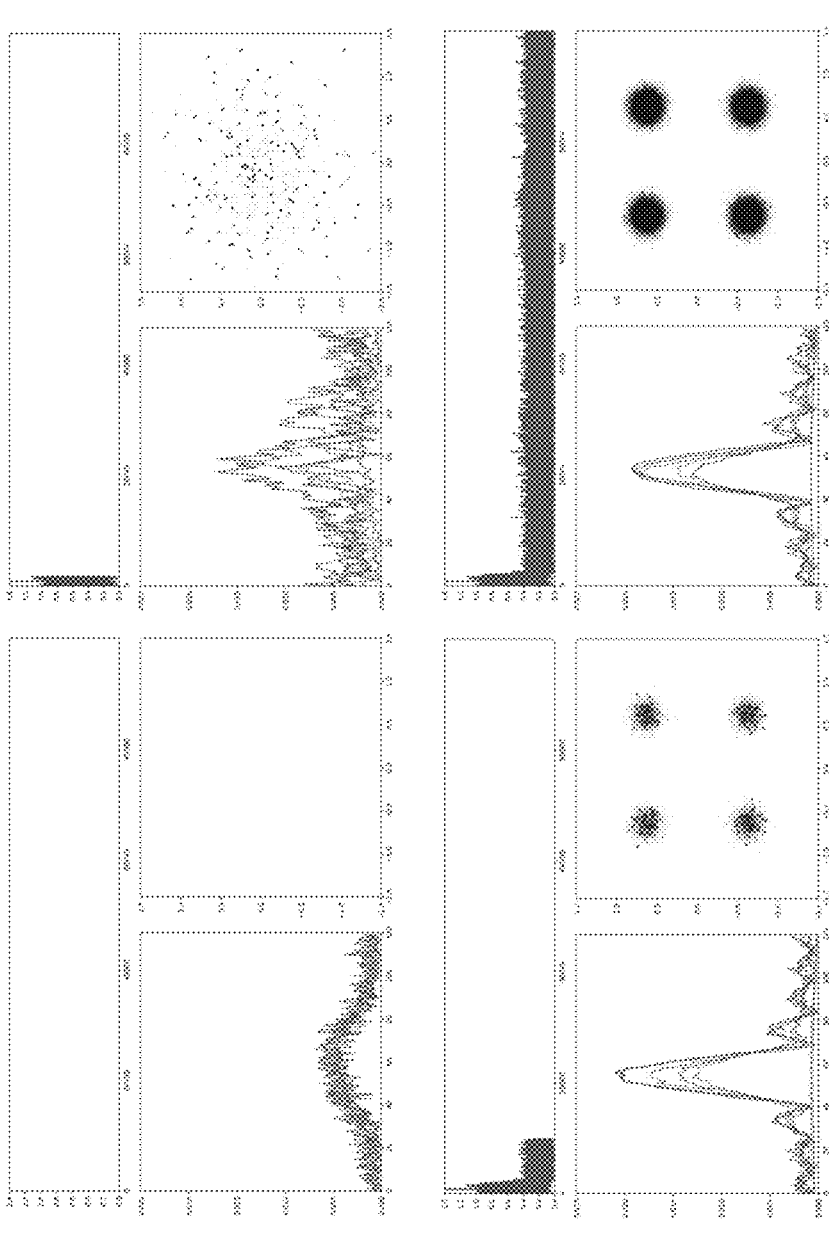

Turning to FIGS. 37 and 38, shown therein is the received signal. For proper reconstruction, the received strips must be aligned in frequency, phase, amplitude and time. Timing alignment can be assumed since the strips were created jointly. Each strip is filtered, up-sampled and put into its correct relative frequency position based on the aligned filters used in the transmitter. After up-sampling and frequency alignment, the samples are subsequently interleaved and fed to a LN-LMS equalizer. The end result is the initial waveform burst from which the process began.

What is claimed is:

1. A method for providing additional covert aspects to a communications system comprising:
    creating a single-carrier base waveform;
    dividing up the single-carrier base waveform in frequency and/or time; and
    redistributing a plurality of subcarriers in a pseudo random order and channel assignment, wherein the step of dividing comprises using multiple matched polyphase filter bank channelizers on the single-carrier base waveform.

2. The method according to claim 1, wherein the step of redistributing comprises channelizing a single-carrier based waveform in such a way that each individual channel has a bandwidth well below a Nyquist rate for any information carried by the base waveform, thereby making full data extraction from any individual channels a theoretic impossibility.

3. The method according to claim 1, wherein each of a plurality of individual channels do not carry enough information from the base waveform to be useful and only in the aggregate can the entire base waveform be reconstructed by the receiver.

4. The method according to claim 1, wherein after said creating, a plurality of individual channels are up-converted onto pseudo-randomly chosen carrier frequencies within the bandwidth of the high rate hardware IF in such a way as to obfuscate the order in which they occur in the base waveform.

5. A method for obfuscating a carrier in a communications system comprising:
    creating a base waveform burst as the carrier;
    creating a plurality of channelizers with a plurality of aligned filters;
    channelizing the base waveform burst using the plurality of channelizers; and
    distributing a plurality of strips resulting from the channelizing across multiple time slots and frequencies.

6. The method according to claim 5, wherein the step of channelizing comprises using multiple matched polyphase filter bank channelizers on a single-carrier base waveform.

7. The method according to claim 5, wherein the steps of channelizing and distributing comprise channelizing a single-carrier based waveform in such a way that each individual channel has a bandwidth well below a Nyquist rate for any information carried by the base waveform, thereby making full data extraction from any individual channels a theoretic impossibility.

8. The method according to claim 5, wherein a plurality of resulting individual channels do not carry enough information from the base waveform to be useful and only in the aggregate can an entire base waveform be reconstructed by a receiver.

9. The method according to claim 5, wherein a plurality of individual channels are up-converted onto a plurality of pseudo-randomly chosen carrier frequencies within a bandwidth of a high rate hardware IF in such a way as to obfuscate an order in which they occur in the base waveform.

10. The method according to claim 5, further comprising in a receiver:

aligning a plurality of received strips in frequency, phase, amplitude and time; and for each strip, filtering the strip, up-sampling the strip and placing the strip into a correct relative frequency position based on the plurality of aligned filters used in the transmitter.

11. The method according to claim 10, wherein after said up-sampling the strip and said placing the strip into a correct relative frequency position, a plurality of resulting samples are interleaved and fed to a LN-LMS equalizer to create an initial waveform burst which was transmitted.

12. A communications apparatus comprising:

a transmitter to:

create a base waveform burst as the carrier;

create a plurality of channelizers with a plurality of aligned filters;

channelize the base waveform burst using the plurality of channelizers; and distributing a plurality of strips resulting from the channelizing across multiple time slots and frequencies; and a receiver to:

align a plurality of received strips in frequency, phase, amplitude and time; and for each strip, filter the strip, up-sample the strip and place the strip into a correct relative frequency position based on the plurality of aligned filters used in the transmitter; and interleave and feed a plurality of resulting samples to a LN-LMS equalizer to create an initial waveform burst which was transmitted.

13. The apparatus according to claim 12, wherein the transmitter uses a plurality of matched polyphase filter bank channelizers to channelize the base waveform burst, which has a single carrier frequency.

14. The apparatus according to claim 12, wherein to channelize and distribute the transmitter channelizes a single-carrier based waveform in such a way that each individual channel has a bandwidth well below a Nyquist rate for any information carried by the base waveform, thereby making full data extraction from any individual channels a theoretic impossibility.

15. The apparatus according to claim 12, wherein a plurality of resulting individual channels do not carry enough information from the base waveform to be useful and only in the aggregate can an entire base waveform be reconstructed.

16. The apparatus according to claim 12, wherein the transmitter up-converts a plurality of individual channels onto a plurality of pseudo-randomly chosen carrier frequencies within a bandwidth of a high rate hardware IF in such a way as to obfuscate an order in which they occur in the base waveform.

17. A communications apparatus comprising:

a transmitter including:

a signal generator to create a base waveform burst as a carrier signal;

a plurality of matched polyphase filter bank channelizers to channelize the carrier signal into a plurality of strips such that each individual strip of the plurality of strips has a bandwidth well below a Nyquist rate for information carried by a base waveform, making full data extraction from said individual channels a theoretic impossibility;

a plurality of pseudo random IF upconverters to upconvert the plurality of strips into a plurality of predetermined carrier frequencies within a desired bandwidth of the transmitter in a pseudorandom manner to obfuscate an order in which the plurality of strips occur in the base waveform to form an output carrier signal;

an IF output to output the output carrier signal.

18. The communications apparatus according to claim 17, further comprising:

a receiver to:

align a plurality of received strips in frequency, phase, amplitude and time; and for each strip, filter the strip, up-sample the strip and place the strip into a correct relative frequency position based on the plurality of aligned filters used in the transmitter; and interleave and feed a plurality of resulting samples to a LN-LMS equalizer to create an initial waveform burst which was transmitted.

19. The apparatus according to claim 18, wherein:

the transmitter uses a plurality of matched polyphase filter bank channelizers to channelize the base waveform burst, which has a single carrier frequency; and a plurality of resulting individual channels do not carry enough information from the base waveform to be useful and only in the aggregate can an entire base waveform be reconstructed.

*   *   *   *   *